United States Patent
Lamaison et al.

(10) Patent No.: US 11,788,022 B1
(45) Date of Patent: Oct. 17, 2023

(54) AUGMENTING SYNGAS EVOLUTION PROCESSES USING ELECTROLYSIS

(71) Applicant: Dioxycle, Bordeaux (FR)

(72) Inventors: Sarah Lamaison, Bordeaux (FR); David Wakerley, Bordeaux (FR)

(73) Assignee: Dioxycle, Bordeaux (FR)

( * ) Notice: Subject to any disclaimer, the term of this patent is extended or adjusted under 35 U.S.C. 154(b) by 0 days.

(21) Appl. No.: 17/980,912

(22) Filed: Nov. 4, 2022

Related U.S. Application Data

(60) Provisional application No. 63/351,442, filed on Jun. 13, 2022, provisional application No. 63/322,638, filed on Mar. 22, 2022.

(51) Int. Cl.
| | | |
|---|---|---|
| C25B 3/25 | (2021.01) | |
| C25B 15/08 | (2006.01) | |
| C10J 3/82 | (2006.01) | |
| C01B 3/36 | (2006.01) | |
| C01B 3/12 | (2006.01) | |

(Continued)

(52) U.S. Cl.
CPC .................. *C10J 3/82* (2013.01); *C01B 3/12* (2013.01); *C01B 3/36* (2013.01); *C01B 3/48* (2013.01); *C01B 32/40* (2017.08); *C25B 1/04* (2013.01); *C25B 3/03* (2021.01); *C25B 3/07* (2021.01); *C25B 3/09* (2021.01); *C25B 3/25* (2021.01); *C25B 9/19* (2021.01); *C25B 11/075* (2021.01); *C25B 15/08* (2013.01); *C01B 2203/0233* (2013.01); *C01B 2203/0238* (2013.01); *C01B 2203/0255* (2013.01); *C01B 2203/0283* (2013.01); *C01B 2203/062* (2013.01); *C01B 2203/1241* (2013.01); *C10J 2200/06* (2013.01);

(Continued)

(58) Field of Classification Search
CPC .. C25B 3/25; C25B 11/04; C25B 1/04; C25B 1/135
See application file for complete search history.

(56) References Cited

U.S. PATENT DOCUMENTS

| | | | |
|---|---|---|---|
| 10,961,632 B2 | 3/2021 | Ono et al. | |
| 2008/0029388 A1* | 2/2008 | Elangovan | ................ C25B 1/02 204/242 |

(Continued)

FOREIGN PATENT DOCUMENTS

| | | | | |
|---|---|---|---|---|
| WO | 2008134871 A1 | 11/2008 | | |
| WO | WO-2019049476 A1 * | 3/2019 | ......... | B01D 53/1475 |

OTHER PUBLICATIONS

Jouny, M., Luc, W. & Jiao, F. "High-rate electroreduction of carbon monoxide to multi-carbon products". Nat Catal 1, 748-755 (2018).

(Continued)

*Primary Examiner* — Imran Akram
(74) *Attorney, Agent, or Firm* — Daylight Law, P.C.

(57) ABSTRACT

Methods and systems related to augmenting syngas production using electrolysis are disclosed. A disclosed method includes harvesting a volume of carbon monoxide from a syngas production system operating on a volume of natural gas, supplying the volume of carbon monoxide to a cathode area of an electrolyzer, and generating, using the volume of carbon monoxide and the electrolyzer, a volume of generated chemicals. The volume of generated chemicals is at least one of: a volume of hydrocarbons, a volume of olefins, a volume of organic acids, a volume of alcohols, and a volume of N-rich organic compounds.

19 Claims, 13 Drawing Sheets

(51) Int. Cl.
   *C01B 32/40*    (2017.01)
   *C25B 1/04*     (2021.01)
   *C25B 11/075*   (2021.01)
   *C25B 9/19*     (2021.01)
   *C25B 3/03*     (2021.01)
   *C25B 3/07*     (2021.01)
   *C25B 3/09*     (2021.01)
   *C01B 3/48*     (2006.01)

(52) U.S. Cl.
   CPC .... *C10J 2200/12* (2013.01); *C10J 2300/0916* (2013.01); *C10J 2300/0966* (2013.01); *C10J 2300/0973* (2013.01); *C10J 2300/1659* (2013.01); *C10J 2300/1665* (2013.01)

(56) References Cited

U.S. PATENT DOCUMENTS

| | | | | |
|---|---|---|---|---|
| 2008/0283411 | A1* | 11/2008 | Eastman | C10G 2/30 205/343 |
| 2012/0172460 | A1 | 7/2012 | Lecomte | |
| 2013/0072583 | A1 | 3/2013 | Koskinen et al. | |
| 2013/0144087 | A1 | 6/2013 | Arora | |
| 2019/0032228 | A1* | 1/2019 | Krause | C25B 9/19 |
| 2020/0347502 | A1* | 11/2020 | Dismukes | B01J 23/72 |
| 2020/0385877 | A1* | 12/2020 | Martic | C23C 24/02 |
| 2021/0140056 | A1* | 5/2021 | Jiao | C25B 9/19 |
| 2023/0145019 | A1* | 5/2023 | Magori | C25B 9/65 204/253 |

OTHER PUBLICATIONS

Jouny, Matthew, Hutchings, Gregory S., and Jiao, Feng. 2019. "Carbon monoxide electroreduction as an emerging platform for carbon utilization". United States.

Li, C., Ciston, J. & Kanan, "Electroreduction of carbon monoxide to liquid fuel on oxide-derived nanocrystalline copper." Nature 508, 504-507 (2014).

* cited by examiner

_US 11,788,022 B1_

AUGMENTING SYNGAS EVOLUTION PROCESSES USING ELECTROLYSIS

CROSS REFERENCE TO RELATED APPLICATIONS

This application claims the benefit of U.S. Provisional Patent Application No. 63/322,638 filed Mar. 22, 2022, and U.S. Provisional Patent Application No. 63/351,442 filed Jun. 13, 2022, which are both incorporated by reference herein in their entireties for all purposes.

BACKGROUND

There is an urgent need to reduce the emissions related to the production of useful fuels and chemicals in our society. Furthermore, there is a need for the widespread adoption of fuels which burn cleanly (i.e., do not produce gaseous carbon upon combustion) in place of the fossil fuels that are used throughout our society. As such, processes which generate dihydrogen gas (also referred to as 'hydrogen gas' in the following) and syngas with low carbon dioxide ($CO_2$) emissions are key technologies for building a sustainable fuel and chemical production platform for the future.

Hydrogen gas can be used as a source of energy in various reactors including fuel cells and dihydrogen combustion systems. It can also be used in multiple industrial processes and in particular chemical processes. Dihydrogen gas burns clean but requires a large amount of energy to be generated in the first place. The processes required to generate this large amount of energy can antithetically involve the generation of carbon byproducts. Dihydrogen gas can be categorized based on the environmental impact of producing the dihydrogen gas. Grey hydrogen is dihydrogen produced using processes that emit carbon byproducts into the atmosphere and thereby negate, to a certain degree, the benefits of using dihydrogen as a substitute for hydrocarbon fuels. Blue hydrogen is dihydrogen produced using a process that generates carbon byproducts, but that captures and sequestrates the carbon byproducts rather than emitting them into the atmosphere. Green hydrogen is dihydrogen produced without or with very limited generation of carbon byproducts such as by using renewable energy sources to power the process of generating the dihydrogen through the electrolysis of water.

Syngas is a mixture of dihydrogen ($H_2$) and carbon monoxide (CO) in various ratios. The gas often also includes $CO_2$ and methane ($CH_4$). Syngas can be used as a feedstock to produce dihydrogen gas or as a feedstock for the production of chemicals or synthetic fuels. Syngas can also be directly used as a fuel for the generation of electricity or as the feedstock for internal combustion engines.

Different techniques are available to produce dihydrogen and syngas. Syngas can be generated by processing various feedstocks containing carbon and hydrogen atoms such as natural gas, hydrocarbons, biomass, or certain waste products. The processes used to generate syngas from these feedstocks can be referred to as syngas evolution processes. For example, natural gas can be processed to separate the dihydrogen out of the methane and other hydrocarbons in the natural gas. The carbon that is left behind bonds to oxygen and produces carbon monoxide and carbon dioxide, together referred to as carbon oxides. Syngas can be produced with various ratios of dihydrogen gas to carbon oxides depending upon the application in which the syngas will be used. In specific applications, the ratio is taken to zero as all the carbon oxides are removed to produce pure dihydrogen gas. In these applications, blue hydrogen can be generated from syngas using a syngas evolution process that first generates syngas in a way that captures the carbon, and further separates out and captures the carbon oxides from the syngas, to isolate the pure dihydrogen gas.

Blue hydrogen currently has an advantage over green hydrogen from both an economic perspective and from the maturity of the associated technology. Blue hydrogen also has a significant advantage over grey hydrogen in terms of environmental impact. As a result, blue hydrogen is expected to play an important role in the scale-up of a global hydrogen power infrastructure due to its scalability and relatively low-cost. However, the remaining problem with blue hydrogen is the cost of carbon capture and the low chances of such costs decreasing over time. The capture of carbon dioxide from a blue hydrogen process has been reported to add 30% to 100% to the final cost of the hydrogen gas and places the overall cost at approximately $1.40-$2.40 per kilogram of blue hydrogen, compared to grey hydrogen with a price that can reach as low as $1.00 per kilogram. As a result, there are many facilities that produce syngas, or generate syngas specifically for the production of hydrogen gas, which are not equipped with carbon capture and storage facilities and instead simply emit the generated carbon dioxide into the atmosphere.

SUMMARY

Methods and systems related to the augmentation, using electrolysis, of syngas evolution processes are disclosed herein. In specific embodiments, the carbon monoxide generated from a syngas production system is directly or indirectly harvested for use in an electrolyzer to produce at least one of hydrocarbons, olefins, organic acids, alcohols or N-rich organic compounds.

In specific embodiments of the invention, a method is provided. The method comprises harvesting a volume of carbon monoxide from a syngas production system, supplying the volume of carbon monoxide to a cathode area of an electrolyzer, and generating, using the volume of carbon monoxide and the electrolyzer, a volume of generated chemicals. In specific embodiments of the invention, the electrolyzer is a specialized electrolyzer which is designed for the electrochemical reduction of carbon monoxide as described in the detailed description below. The volume of generated chemicals is at least one of: a volume of hydrocarbons, a volume of organic acids, a volume of alcohol, a volume of olefins and a volume of N-rich organic compounds.

In specific embodiments of the invention, a system is provided. The system comprises a syngas production system configured to produce a volume of syngas, a first connection fluidly connected to a syngas output of the syngas production system, a separating system fluidly connected to the first connection and configured to separate a volume of carbon monoxide from the volume of syngas, a second connection fluidly connected to a carbon monoxide output of the separating system, and an electrolyzer having a cathodic input fluidly connected to the second connection and configured to generate a volume of generated chemicals from the volume of carbon monoxide. The volume of generated chemicals is at least one of: a volume of hydrocarbons, a volume of organic acids, a volume of alcohol, a volume of olefins and a volume of N-rich organic compounds.

In specific embodiments of the invention, a method is provided. The method comprises supplying a volume of carbon dioxide and a volume of natural gas to a reforming process. The method also comprises harvesting a volume of carbon monoxide from the reforming process. The method also comprises supplying the volume of carbon monoxide to a cathode area of an electrolyzer and generating, using the volume of carbon monoxide and the electrolyzer, a volume of generated chemicals.

DETAILED DESCRIPTION

Figure 1:
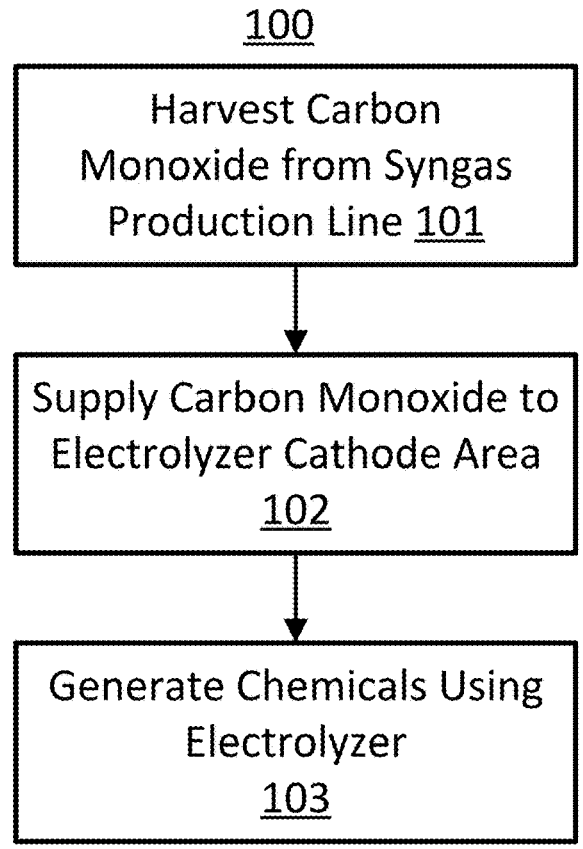
FIG. 1 illustrates a flow chart for a set of methods for augmenting a syngas production system in accordance with specific embodiments of the inventions disclosed herein.
Figure 1:
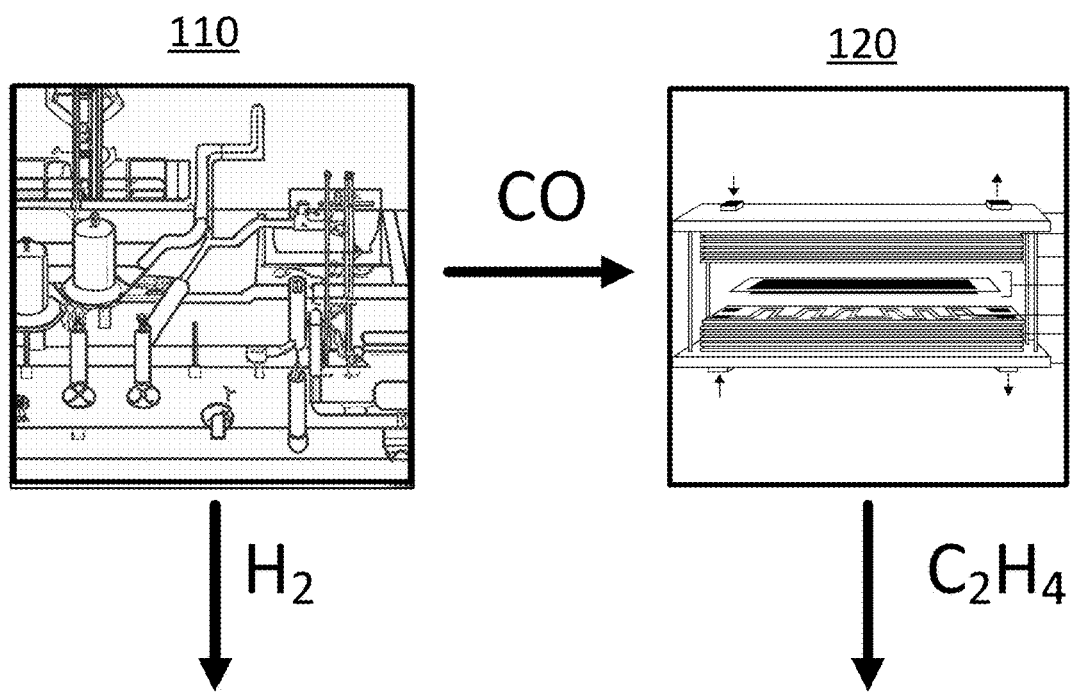

Methods and systems related to the augmentation, using electrolysis, of a syngas evolution process in accordance with the summary above are disclosed in detail herein. The methods and systems disclosed in this section are nonlimiting embodiments of the invention, are provided for explanatory purposes only, and should not be used to constrict the full scope of the invention. It is to be understood that the disclosed embodiments may or may not overlap with each other. Thus, part of one embodiment, or specific embodiments thereof, may or may not fall within the ambit of another, or specific embodiments thereof, and vice versa. Different embodiments from different aspects may be combined or practiced separately. Many different combinations and sub-combinations of the representative embodiments shown within the broad framework of this invention, that may be apparent to those skilled in the art but not explicitly shown or described, should not be construed as precluded.

The production of syngas or pure dihydrogen gas can involve a syngas evolution process which results in the generation of carbon monoxide. The carbon monoxide can be generated in a syngas evolution reaction in which a mixture of dihydrogen, carbon monoxide, and potentially other chemicals are generated. The other chemicals can include carbon dioxide and other carbon containing chemicals. The term syngas evolution reaction is used with reference to the fact that a feedstock has been at least partially evolved into syngas. The reaction can be part of a further reaction in which a final composition of dihydrogen and carbon monoxide is reached, or all the dihydrogen has been separated out to form pure dihydrogen gas. In accordance with specific embodiments of the invention disclosed herein, the carbon monoxide products generated during such a syngas evolution reaction can be harvested for specific purposes.

The harvesting of carbon monoxide from a syngas evolution reaction can be direct harvesting or indirect harvesting. In indirect harvesting, the carbon monoxide from the syngas evolution reaction can be piped to storage tanks and then sealed off. The tanks can then be transported to where the carbon monoxide will be utilized or be stored locally and used at a later time. In contrast, in direct harvesting, the carbon monoxide from the syngas evolution can be directly piped from a reactor or other system in which the syngas evolution reaction occurs to an electrolyzer or other system (e.g., one or multiple intermediate steps may be conducted before the carbon monoxide is delivered to the electrolyzer) in which the carbon monoxide will be utilized. In specific embodiments of the invention, the two systems (e.g., the reactor and the electrolyzer) can be located in a single industrial facility. Indeed, in specific embodiments of the invention, existing syngas or dihydrogen production facilities can be augmented using the systems disclosed herein to enable direct harvesting of carbon monoxide that would otherwise have been emitted directly into the atmosphere or first converted into carbon dioxide and then emitted into the atmosphere from those facilities.

FIG. 1 includes a flow chart 100 for a set of methods for augmenting a syngas production system in accordance with specific embodiments of the invention disclosed herein. Flow chart 100 includes a step 101 of harvesting a volume of carbon monoxide from a syngas production system. The syngas production system may be operating on a volume of natural gas, biomass, waste (e.g., biowaste, plastics, mix of wastes), or other feedstocks. The natural gas may be in liquified or gaseous form and the term "gas" as used in that phrase is not meant to limit the state of the natural gas to gaseous form as those of ordinary skill in the art know that natural gas can be transported and processed in liquified form while still referring to the natural gas using the term "natural gas" (i.e., liquified natural gas). Throughout this disclosure the term "fluid" will be used to refer to describe a substance that is in any physical form including in liquid, gaseous, supercritical or a combination of liquid and gaseous form.

The syngas production system can be part of a dihydrogen production line 110 utilizing a syngas evolution process. The syngas production system may include a syngas evolution process that generates a volume of dihydrogen, such as dihydrogen gas, and a volume of carbon monoxide. The harvesting can involve harvesting the entire volume of carbon monoxide generated by the syngas production system or a portion of the volume of carbon monoxide generated by the syngas production system. The volume of carbon monoxide can be harvested as part of a carbon-monoxide containing stream in which the volume of carbon monoxide is mixed with other chemicals or impurities. As stated elsewhere herein, the term "volume of" a substance (e.g., volume of carbon monoxide) is not meant to indicate a separate, distinct, and purified physical volume but is meant to refer to a collection of matter in the same sense that a cup of coffee with a tablespoon of milk added includes "a volume" of milk where that volume is a tablespoon.

The harvesting of the carbon monoxide can be direct harvesting and all the steps of flow chart 100 may be conducted in a single facility. The harvesting of the carbon monoxide can be conducted in line with the syngas production system. For example, dihydrogen production line 110 could be in the same facility as electrolyzer 120 and the carbon monoxide generated by the dihydrogen production line 110 could be harvested and provided directly to the electrolyzer 120 or with one or more intermediate steps between 110 and 120 to pre-treat the CO-containing stream prior to it being fed to the electrolyzer. A syngas-production system could be fluidly connected to a separating system used to harvest the carbon monoxide from the syngas. The fluid connection could be provided through one or more valves, one or more seals, and/or one or more regulators or additional instrument in a pipe or other connection coupling an output of the syngas-production system to an area at which the carbon monoxide will be used. Alternatively, the harvesting of the carbon monoxide can be indirect harvesting in which the area for the process that generates the volume of carbon monoxide is fluidly connected to one or more storage tanks which store the carbon monoxide for transportation and/or use at a later time. In either case, the machinery in which the syngas evolution process is conducted and the machinery in which the carbon monoxide is utilized in an electrolysis process can be in a single industrial facility such as a refinery, biorefinery, chemical plant, industrial laboratory, waste treatment plant or other facility. The carbon monoxide can be harvested from this process in various ways as described below.

In specific embodiments of the invention, the carbon monoxide can be separated from syngas generated by a syngas production system. The carbon monoxide can be separated from the syngas using various approaches such as separating with membranes, cryogenic separating, separating methods based on variant physical or chemical properties of the components of the syngas, separation based on pressure-swing adsorption, temperature-swing adsorption, vacuum- or vacuum-pressure swing adsorption, or separation based on absorption. For example, a separating system can be used on the syngas to first cool the syngas to remove impurities and then heat the syngas to allow purified dihydrogen to evaporate through a membrane that filters out carbon monoxide.

The systems utilized to conduct the separating steps and processes above can take on various forms. The separation system may conduct one or more of multiple separation/purification steps including any technology available for the targeted purification/separation. The separation system can include separation units based on but not limited to membrane technologies including but not limited to dense polymeric membranes, ultrafiltration and nano-filtration membranes, facilitated-transport membranes, metallic membranes, hollow fiber pervaporation membranes, cryogenic technologies, adsorption technologies including but not limited to physisorption and chemisorption technologies, absorption technologies, including physical absorption technologies and chemical absorption technologies, with operation techniques such as but not limited to vacuum pressure swing, temperature swing, pressure swing, arid pressure swing, coupled pressure and temperature swing, and electric swing. Chemical adsorbents that can be used include but are not limited to amine-based adsorbents (amine grafted or impregnated solids), metal oxides, metal salts, double salts and hydrotalcites. Physical adsorbents that can be used include but are not limited to materials such as carbon-based materials, mesoporous silica, zeolites, zeolitic imidazolate frameworks (ZIF's), metalorganic frameworks (MOF's), blended adsorbents.

Crude syngas can have a dihydrogen to carbon monoxide ratio of 1 to 5 depending on the feedstock and the process used to generate the syngas. Approaches that are used to modify this ratio can be used to create concentrated streams of dihydrogen and carbon monoxide. In specific embodiments of the invention, the process used to generate the carbon monoxide does not need to pull all the carbon monoxide out of the syngas to leave behind only pure dihydrogen. Indeed, if the purpose of the overall process is the production of syngas with a certain ratio of carbon monoxide to dihydrogen, the harvesting and separating steps disclosed herein can be calibrated to only remove a portion of the carbon monoxide in a syngas product. In these approaches, the process of harvesting the volume of carbon monoxide could comprise supplying a volume of syngas from the syngas production system to a separation system, and separating a volume of dihydrogen and the volume of carbon monoxide from the volume of syngas using the separation system to leave behind a second volume of syngas. The separation system could be configured to separate the volume of carbon monoxide from the volume of syngas to achieve a target ratio of carbon monoxide to hydrogen in the second volume of syngas.

In specific embodiments of the invention, the syngas evolution process that generates a volume of carbon monoxide can take on various forms. Syngas can be produced using various feedstocks and various processes. Processes for generating syngas include reforming techniques, oxidation or partial oxidation (PDX) techniques, and gasification of biomass or waste (e.g., biowaste, plastic, or any waste containing carbon-rich molecules). Reforming techniques can further be broken down into steam reforming such as steam methane reforming (SMR), autothermal reforming (ATR), and dry reforming techniques. Some reforming techniques at a less advanced stage of development also involve the use of plasma. The feedstocks for reform and partial oxidation techniques can be natural gas including methane, or any carbon feedstock including naphtha, and other hydrocarbon fuels. Carbon dioxide can also be used as a co-reactant of the abovementioned techniques. The feedstock for gasification techniques can include biomass and/or waste such as biowaste, plastic, or any waste containing carbon-rich molecules, or any of the feedstocks mentioned above.

The selected technique and feedstock will have an impact on the ratio of carbon to dihydrogen gas that is ultimately produced. If dihydrogen gas production is the goal, SMR is an advantageous approach because it generates the highest ratio of dihydrogen to carbon in the output with methane as an input. Throughout this disclosure, the example of natural gas and methane are used as an example of the feedstocks for the syngas evolution processes described herein. However, other feedstocks mentioned above can be used in their place.

Equations for various techniques described in the prior paragraphs are provided as follows with methane from natural gas serving as the feedstock in each example. With specific reference to natural gas and methane, the reforming techniques mentioned above can be referred to as SMR, autothermal reforming, and dry methane reforming (DMR). In SMR, methane from natural gas is heated with steam, and often with a catalyst, to produce a mixture of carbon monoxide and dihydrogen. Blue hydrogen can be generated using a process involving the generation of syngas, using a syngas evolution process in the form of SMR. SMR can be conducted on a feedstock of methane gas, followed by a water-gas shift reaction (WGSR) in which the carbon monoxide from the syngas reacts with water to produce additional dihydrogen gas and carbon dioxide gas. The equations for SMR and WGSR are as follows:

$$SMR: CH_4+H_2O \rightarrow 3H_2+CO \tag{1}$$

$$WGS: CO+H_2O \leftrightarrow CO_2+H_2 \tag{2}$$

ATR can be conducted with water or $CO_2$ as a co-reactant. The equations for ATR with $CO_2$ as a co-reactant and with water as a co-reactant are:

$$ATR \text{ (with } CO_2\text{)}: 2CH_4+O_2+CO_2 \rightarrow 3H_2+3CO+H_2O \tag{3}$$

$$ATR \text{ (with } H_2O\text{)}: 4CH_4+O_2+2H_2O \rightarrow 10H_2+4CO \tag{4}$$

Dry methane reforming also utilizes carbon dioxide as a co-reactant and can be conducted according to the following formula:

$$CH_4+CO_2 \rightarrow 2CO+2H_2 \tag{5}$$

In the case of PDX with methane as a feedstock, the partial oxidation of methane is conducted according to the equation:

$$CH_4+0.5O_2 \rightarrow CO+2H_2 \tag{6}$$

The choice of the syngas evolution process utilized for a given production line depends on the fossil feedstock available as well as the targeted syngas ratio. For example, SMR is used to produce hydrogen-rich syngas streams with a typical $H_2$/CO ratio of 3:1 to 5:1. ATR is used to produce hydrogen-rich syngas streams with a typical $H_2$/CO ratio of 1:1 to 2.5:1. PDX is used to produce syngas streams with a typical $H_2$/CO ratio of 1.6 to 1.8.

Gasification involves heat treatment of feedstock material at high temperatures without full combustion notably via the controlled introduction of oxygen or steam. Gasification for purposes of producing dihydrogen in a syngas production process can be represented by the following equation:

$$\text{Energy-rich substrate for gasification} \rightarrow xH_2+yCO \tag{7}$$

Figure 2A:
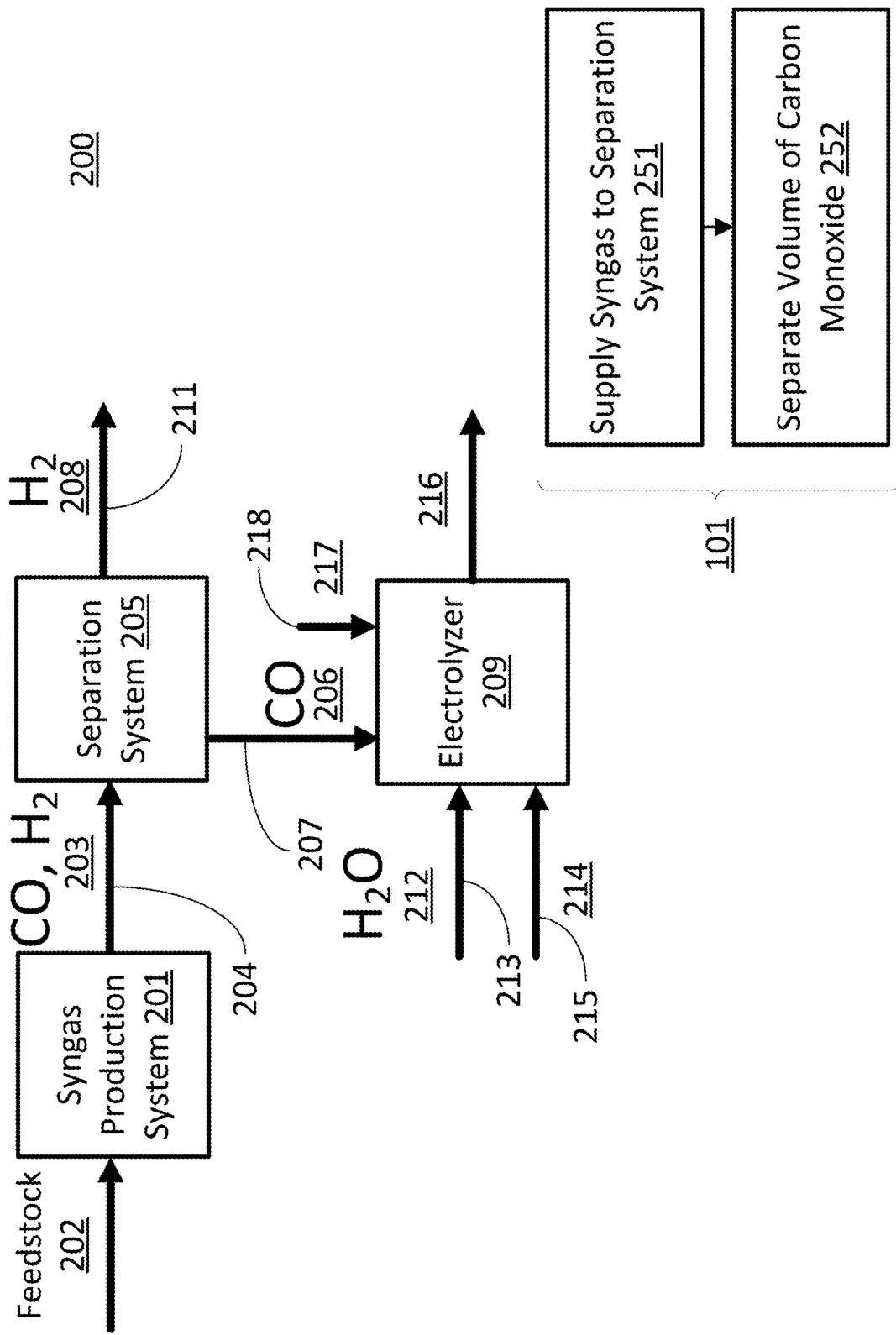
FIG. 2A illustrates a system for augmenting a syngas production system in accordance with specific embodiments of the inventions disclosed herein.

FIG. 2A illustrates a system 200 for augmenting a syngas evolution process in accordance with specific embodiments of the invention disclosed herein. The system includes a syngas production system 201 configured to produce a volume of syngas using a syngas evolution process. The feedstock 202 can be natural gas, biomass, biowaste, carbon-rich waste or other feedstocks for syngas production as described herein. In the embodiments in which the feedstock 202 for the syngas production processes is at least one of biomass, biowaste or any carbon-rich waste, the syngas production system 201 can be a gasification system and the syngas evolution process conducted by the syngas production system can be a gasification process. In the embodiments in which the feedstock 202 is natural gas, the syngas production system 201 can be a reforming system such as a steam methane reforming system, dry reforming system or, autothermal reforming, or an oxidation system such as a partial oxidation system. The syngas production system 201 can be configured, using any of the processes described above, to convert feedstock 202 into syngas 203. The syngas 203 can then be routed through a first connection 204 and delivered to a separation system 205 which can be used to harvest the carbon monoxide 206 from syngas 203 such as in step 101 as described above. First connection 204 can also carry carbon dioxide and other impurities with syngas 203. The carbon monoxide 206 can be provided to a second connection 207 from a carbon monoxide output of separation system 205. The separation system can be designed to separate out at least part of the carbon monoxide from the syngas and route low carbon syngas or pure dihydrogen gas 208 out a different pipe or manifold. In the illustrated example, pure dihydrogen gas is generated and routed out of a separate pipe or connection 211.

FIG. 2A represents a system that can conduct a specific implementation wherein the harvesting of the volume of carbon monoxide as in step 101 can comprise a step 251 of supplying a volume of syngas from the syngas production system to a separation system and a step 252 of separating a volume of dihydrogen and the volume of carbon monoxide from the volume of syngas using the separation system. In the illustrated case, the volume of dihydrogen is pure dihydrogen gas 208 collected on a separate pipe or connection 211. However, in alternative embodiments, depending upon the original feedstock for the system, the syngas evolution process, and the separation system, the volume of dihydrogen gas can instead be lower-carbon-content dihydrogen including a low-carbon dihydrogen gas (i.e., dihydrogen gas with remaining amounts of carbon). The low-carbon dihydrogen gas can then be used as syngas for a specific process requiring the resulting ratio of carbon to dihydrogen or further purified.

Flow chart 100 further includes a step 102 of supplying the volume of carbon monoxide to a cathode area of an electrolyzer. This step can involve providing the volume of carbon monoxide to a cathode input of the electrolyzer at a cathodic input of the electrolyzer. The volume of carbon monoxide can be mixed with additional fluids in order to form a cathodic input fluid or can be kept pure such that the cathodic input fluid was pure carbon monoxide. This step can involve transporting tanks of carbon monoxide from an area at which the carbon monoxide was harvested and connecting it to a connection or pipe coupled to the cathode area of an electrolyzer. The step can also involve storing the carbon monoxide in tanks temporarily until the price of electricity declines and then supplying the stored carbon monoxide to the electrolyzer when it becomes more economical to do so. The step can alternatively involve routing the carbon monoxide through a connection or pipe directly from a syngas production system to an electrolyzer in the same industrial facility. The electrolyzer can have the characteristics described below with reference to FIGS. 5-7. The connection or pipe can include seals and valves which allow the carbon monoxide to be controllably delivered to the electrolyzer as a cathodic input fluid. The connection or pipe can allow alternative fluids such as water or other feedstocks or impurities from the syngas producing process to be mixed with the carbon monoxide in order to form the cathodic input fluid for the electrolyzer. This is illustrated by connection 218 carrying alternative chemicals 217 to electrolyzer assembly 209. In FIGS. 2-4, the top of the electrolyzer represents cathodic inputs to the cathode area of the electrolyzer and the left of the electrolyzer represents anodic inputs to the anode area of the electrolyzer. In specific embodiments of the invention, the contents of connection 218 and connection 207 can be mixed before being provided to the electrolyzer assembly. The connection or pipe may allow the carbon monoxide to alternatively be delivered to other systems such as other electrolyzers or to a water gas shift system. The valves and seals and any other necessary instrument may be configurable to route the carbon monoxide to the one system at a first time and then to a second system at a second time. The connection or pipe may be coupled to an accumulation tank or set of tanks located between the electrolyzer and the syngas production system in order to accumulate excess carbon monoxide in case of any discrepancies between the speed of the syngas production system and the electrolyzer. Such accumulation tank or set of tanks could also be used to temporarily store carbon monoxide during periods of high electricity cost.

Figure 2B:
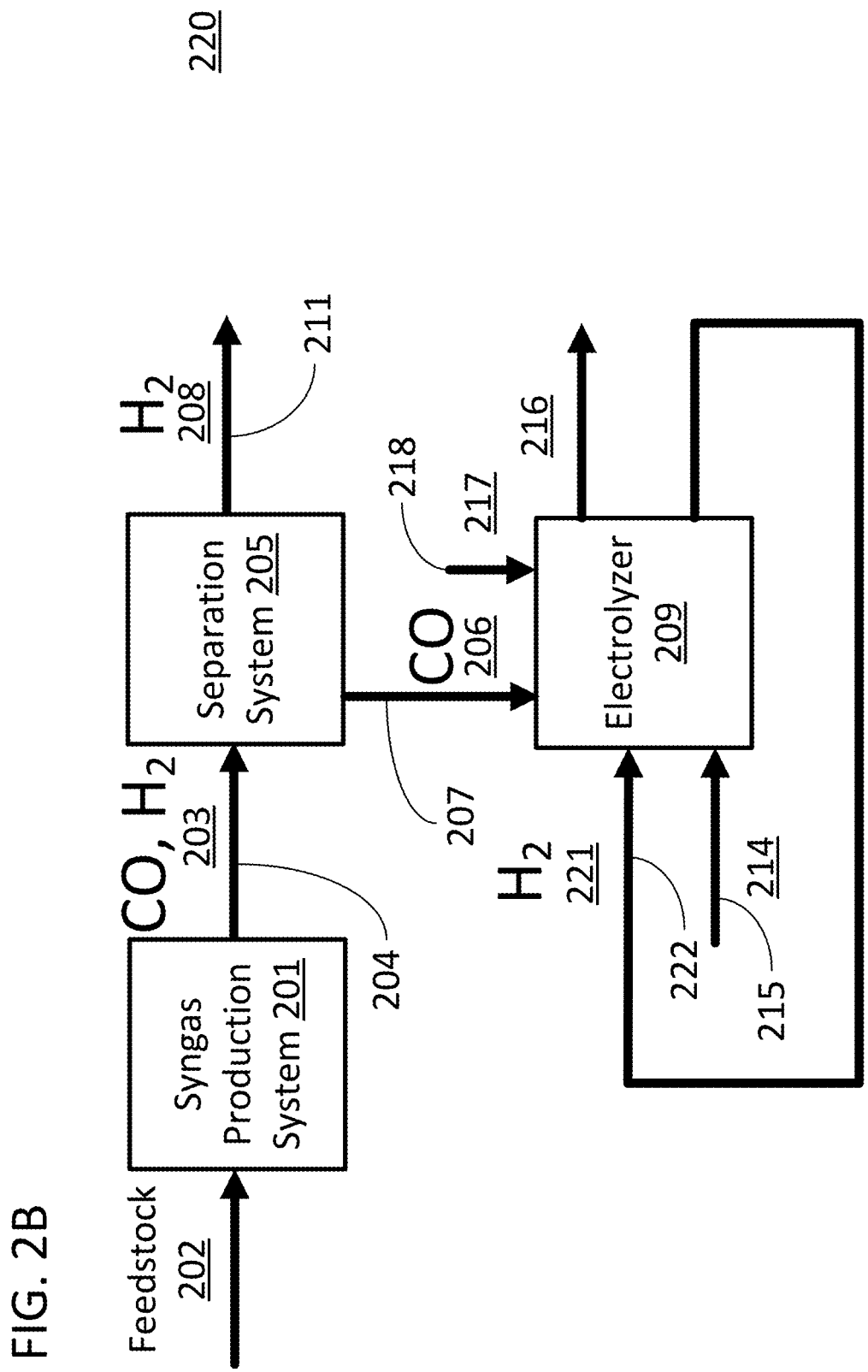
FIG. 2B illustrates a system for augmenting a syngas production system using circulated dihydrogen gas in accordance with specific embodiments of the inventions disclosed herein.

Flow chart 100 further includes a step 103 of generating, using the volume of carbon monoxide and an electrolyzer, a volume of generated chemicals. For example, electrolyzer 209 could produce generated chemicals 216 using carbon monoxide 206. The volume of generated chemicals can be at least one of a volume of hydrocarbons, a volume of organic acids, a volume of alcohol, and a volume of N-rich organic compounds. Using the illustrated processes, the carbon content of the syngas can be decreased, optionally all the way to the production of pure dihydrogen from the syngas, and the carbon monoxide can be valorized to create useful chemicals that can be used as feedstocks in other industrial processes or in other useful applications. The disclosed methods and system can be used to augment existing syngas production facilities including those which would otherwise emit any excess carbon monoxide or that would use the carbon monoxide to obtain additional dihydrogen gas using a water gas shift reaction and thereby emit carbon dioxide. Using these processes, the generation of blue hydrogen can be made more economically competitive with the production of grey hydrogen in that the market value of the generated chemicals can offset the cost of running the electrolyzer and the use of the carbon monoxide to generate those chemicals removes the cost of carbon storage. In specific embodiments of the invention, the electrolyzer can be operated using dihydrogen gas as an input without external energy or with little addition of external energy. In specific embodiments of the invention, the dihydrogen gas used for this purpose can be dihydrogen gas that is separated from the syngas. In alternative embodiments, as described below, the dihydrogen gas can be dihydrogen gas which is parasitically generated by the electrolyzer and is then circulated from a cathodic output of the electrolyzer to an anodic input of the electrolyzer. For example, system 220 in FIG. 2B illustrates the circulation of dihydrogen 221 on a connection 222 which links the cathodic output to the anodic input such that parasitically generated dihydrogen at the cathodic output is circulated to be used as the oxidation substrate by being supplied at the anodic input. In an alternative embodiment, a portion of dihydrogen 208 could have instead been supplied to serve as the oxidation substrate.

While the system shown in FIG. 2A includes a single separation system and single electrolyzer, many different variations are possible. For example, multiple separating systems can be connected in series to separate out volumes of low-carbon dihydrogen syngas with ever increasing levels of purity and one or more of the multiple separating systems can be coupled to a single electrolyzer for the delivery of carbon monoxide. As another example, multiple such separating systems can be coupled with a set of electrolyzers that are configured to accept cathodic inputs with different levels of carbon monoxide volume or concentration.

System 200 includes an electrolyzer 209 with a cathodic input coupled to a second connection 207 for purposes of receiving a volume of carbon monoxide 206. The electrolyzer is represented with the top line of the block being the cathodic input and the left line of the block being the anodic input. In specific embodiments, the electrolyzer could also include cathode and anode outputs to receive the output fluids from the cathode area and anode area. In specific embodiments, the electrolyzer could also include a separating area output from a separating area of the electrolyzer which is positioned between the cathode area and the anode area and provides a way to capture additional generated chemicals. In specific embodiments, chemicals will be captured from both a separating area output and the anode or cathode outputs. In specific embodiments, multiple chemicals can be captured from any of these outputs in both liquid and gaseous forms. For example, the volume of generated chemicals can include a volume of gaseous hydrocarbon and a volume of liquid products including at least one of liquid organic acid and liquid alcohols. The volume of gaseous hydrocarbon can be captured from a cathodic output of the electrolyzer. The volume of liquid products could then be captured by a trap on the cathodic output or via the separating area output if the electrolyzer includes a separating area.

The electrolyzer can receive a volume of fluid at a cathodic input and a separate volume of fluid at an anodic input. The electrolyzer can convert the carbon monoxide received at the cathodic input into beneficial and valuable chemicals through electrolysis. Additional chemicals, such as nitrogen-containing reactants like ammonia, water, electrolyte water or steam can be provided to the cathodic input with the carbon monoxide in specific embodiments of the invention as disclosed below. For example, these additional chemicals could be provided via connection 218 or be combined with the carbon monoxide in connection 207 before being provided to the electrolyzer assembly 209. In specific embodiments of the invention disclosed below, different chemicals can be provided to the anode area including one or more of water, electrolyte, an oxidation substrate, and dihydrogen gas. The dihydrogen gas can be dihydrogen gas taken from the syngas evolution process or a separate supply of dihydrogen gas. The dihydrogen gas can also be parasitically generated dihydrogen generated in the cathode area which is circulated from a cathodic output of the electrolyzer back to an anodic input of the electrolyzer. In FIG. 2A, the electrolyzer 209 receives water 212 from a connection 213 at an anode input and an oxidation substrate 214 from a connection 215 at the anode input. In specific embodiments of the invention, the additional chemicals, such as water, and oxidation substrate can be combined and provided to the electrolyzer assembly via a single connection. The water provided to either the anodic input or the cathodic input can be provided from a water source. The water source can provide a fluid stream which includes water. The water from the water source can be pure de-ionized water, electrolyte water, or water mixed with any other chemical.

The generated chemicals can be removed from the electrolyzer from a generated chemical output in liquid or gaseous form. The generated chemical output can be fluidly coupled to a separating area of the electrolyzer. In FIG. 2A, the useful chemicals 216 are withdrawn from the electrolyzer via an output collected from a cathodic output stream from the cathode area. In alternative embodiments disclosed below, the useful chemicals can be collected via a separating area between the anode area and the cathode area of the electrolyzer.

Notably absent in flow chart 100 is the step of conducting a water gas shift to harvest more dihydrogen using the carbon monoxide. Indeed, while some of the processes represented by flow chart 100 can be used in combination with a process that does utilize a water gas shift as described below, the processes do not require the use of a water gas shift, and the alternative use of the carbon monoxide as the feedstock for an electrolysis process instead of as a feedstock for a water gas shift reaction is a critical aspect of specific embodiments of the inventions disclosed herein. In these specific embodiments of the inventions, no carbon monoxide from the total volume of natural gas used as a feedstock for the syngas evolution process is used in a water gas shift reaction. For example, feedstock 202 could be a volume of natural gas and no carbon monoxide derived from the volume of natural gas could be used in a water gas shift reactor. Instead, all the carbon monoxide could be used as volume of carbon monoxide 206. In these embodiments the syngas production system (e.g., syngas production system 201) could be an SMR reactor and could conduct an SMR process on the volume of natural gas. In these embodiments, pure dihydrogen could be the desired output of the system. However, in accordance with specific embodiments disclosed below, the carbon monoxide could be used in an electrolyzer as opposed to being used in a water gas shift reactor to produce more dihydrogen. As described below, in alternative embodiments, at least a portion of the carbon monoxide in connection 204 could be used in a WGS reaction and another portion of the carbon monoxide in connection 204 could be provided to an electrolyzer assembly.

Specific benefits accrue to approaches in which a WGS reaction operating on the carbon monoxide from a syngas evolution process is replaced with an electrolyzer operating on the carbon monoxide from a syngas evolution process. In syngas evolution systems where the system is used to ultimately produce dihydrogen, it is of interest to increase the dihydrogen gas to carbon monoxide ratio further than what is produced via a first SMR powered syngas evolution produces. To this end, a WGS reaction step is added for the production of additional $H_2$ from CO according to the following reaction:

WGS: $CO+H_2O \rightarrow CO_2+H_2$ (8)

In the case where SMR is coupled with WGS, the overall equation is:

SMR+WGS: $CH_4+2H_2O \rightarrow 4H_2+CO_2$ (9)

This combined process allows for the production of four moles of dihydrogen gas per mole of methane instead of only three moles of dihydrogen gas in the absence of WGS step. This step however comes at the cost of a production of one mole of carbon dioxide for each additional mole of dihydrogen produced. Hence, for such dihydrogen to be a blue hydrogen, the carbon dioxide must be captured and permanently sequestrated which is costly. Assume that the cost of grey hydrogen ($Cgrey_{H2}$) is $1,000 per ton of dihydrogen gas using the process of equation 9 and emitting all the carbon dioxide. The mass of carbon dioxide ($m(CO_2)$) to capture is a function of the mass of $H_2$ produced by reaction 9:

$$m(CO2) = n(CO2) \times M(CO2) = \frac{n(H2)}{4} \times M(CO2) = m(H2) \times \frac{M(CO2)}{4 \times M(H2)}$$ (10)

where m(CO2) is the mass of carbon dioxide produced in reaction 9, n(CO2) is the corresponding number of moles of carbon dioxide, M(CO2) is the molar mass of carbon dioxide (44 g·mol$^{-1}$), m(H2) is the mass of dihydrogen gas produced in reaction 9, n(H2) is the corresponding number of moles of dihydrogen gas, and M(H2) is the molar mass of dihydrogen gas (2 g·mol$^{-1}$). The mass of carbon dioxide that needs to be captured per ton of dihydrogen gas produced is therefore equal to:

$$m(CO2) = m(H2) \times \frac{44}{4 \times 2} = 5.5 \times m(H2)$$ (11)

Hence, assuming a cost of capture of the carbon dioxide of $30 per ton of carbon dioxide and an additional cost of storage of $110 per ton of carbon dioxide for geological storage, the cost of production of blue hydrogen ($C_{blueH2}$) using SMR and WGS as expressed per ton of dihydrogen gas alongside with the cost of one ton of grey hydrogen is:

$C_{blueH2} = C_{greyH2} + \$140 \times 5.5 = \$1000 + \$770 = \$1770$ (12)

By suppressing the WGS step, and with advantageously coupling the SMR step with a CO-electrolysis step for the production of valuable carbon-based product, we can counterintuitively decrease the cost of equivalently low-carbon dihydrogen. This is counterintuitive because by suppressing the WGS step, the cost of dihydrogen gas increases to $1,333 per ton of dihydrogen gas. This is because we now produce only 3 moles of dihydrogen gas for the same cost as for 4 moles of dihydrogen gas. The cost is effectively the same because most of the process cost comes from the SMR step as compared to the WGS step. However, in specific embodiments, the WGS step is purposefully replaced with a carbon monoxide capture step aimed at capturing the carbon monoxide evolved during the SMR step and providing it to a carbon monoxide electrolyzer to produce high-added-value carbon-based products. In terms of economics, this translates into the following analysis. The mass of carbon monoxide (m(CO)) to capture is a function of the mass of dihydrogen gas produced by the SMR (without the WGS reaction) is provided by the relation:

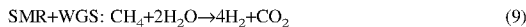

$$m(CO) = n(CO) \times M(CO) = \frac{n(H2)}{3} \times M(CO) = m(H2) \times \frac{M(CO)}{3 \times M(H2)}$$ (13)

where m(CO) is the mass of carbon monoxide produced in reaction 1, n(CO) is the corresponding number of moles of carbon monoxide, M(CO) is the molar mass of carbon dioxide (28 g·mol$^{-1}$), m(H2) is the mass of dihydrogen gas produced in reaction 1, n(H2) is the corresponding number of moles of dihydrogen gas, and M(H2) is the molar mass of dihydrogen gas (2 g·mol$^{-1}$).

The mass of CO that needs to be captured per $t_{H2}$ produced is equal to:

$$m(CO) = m(H2) \times \frac{28}{3 \times 2} \approx 4.7 \times m(H2) \quad (14)$$

Hence, assuming a capture cost of $30 per ton of carbon monoxide similar to the one taken for the capture cost of carbon dioxide, the cost of low-carbon dihydrogen is:

$$C_{LowCarbonH2} = \$1333 + \$30 \times 4.7 = \$1474 \quad (15)$$

Hence, by replacing the WGS by the carbon capture step for downstream carbon monoxide valorization, the economic benefit for the production of low-carbon dihydrogen gas is equal to $1770-$1474=$296 while the carbon monoxide fed to the electrolyzer can be valorized through the sale of the produced volume of chemicals. With this system, the price of low-carbon dihydrogen is not only lower than targeted cost of green hydrogen ($2000 per ton of dihydrogen gas) but also provides a valuable carbon feedstock for the production of valuable products in particular hydrocarbons, alcohols and organic acids such as but not limited to ethylene, ethanol, acetic acid, propylene and propanol.

A further advantage of specific embodiments of the invention is that existing facilities for the production of dihydrogen gas and syngas already include separate reactors for the syngas evolving processes described above such that the installation of separating systems and electrolyzer assemblies to harvest and separate the carbon monoxide can be as simple as connecting new machines to existing outputs on connections that would otherwise have been routed to WGS reactors. In a typical syngas-evolving and WGS system, the syngas-evolving process is an endothermic reaction. In the case of SMR, it is usually conducted at 800-1000° C. and 20-30 bars in the presence of a nickel-based catalyst. However, the WGS process is exothermic requiring different conditions to be optimized and is hence preferably performed in a separate reactor. Due to its exothermicity, the formation of dihydrogen gas through a WGS is thermodynamically unfavored at high temperatures although the reaction is kinetically favored when temperature increases. Hence, to both benefit from thermodynamic and kinetic advantages, WGS is usually performed in a two-step process, a first high-temperature shift step (usually conducted at 300-450° C. using an iron-oxide-based catalyst) and a low-temperature process (usually conducted at 200-250° C. using copper or copper oxide-based catalyst supported on alumina and zinc oxide mixtures). In the present system, the reactors usually employed to perform the two-step water gas shift (i.e., the low-temperature and the high-temperature shift) are suppressed and replaced by a separation system allowing for the separation of the dihydrogen and the carbon monoxide, the latter being then available for the carbon monoxide electrolysis step using the electrolyzers discussed herein. Accordingly, the two separate WGS systems can be replaced with a separation system and single electrolyzer which could maintain or reduce the fixed costs of the production line.

Figure 3A:
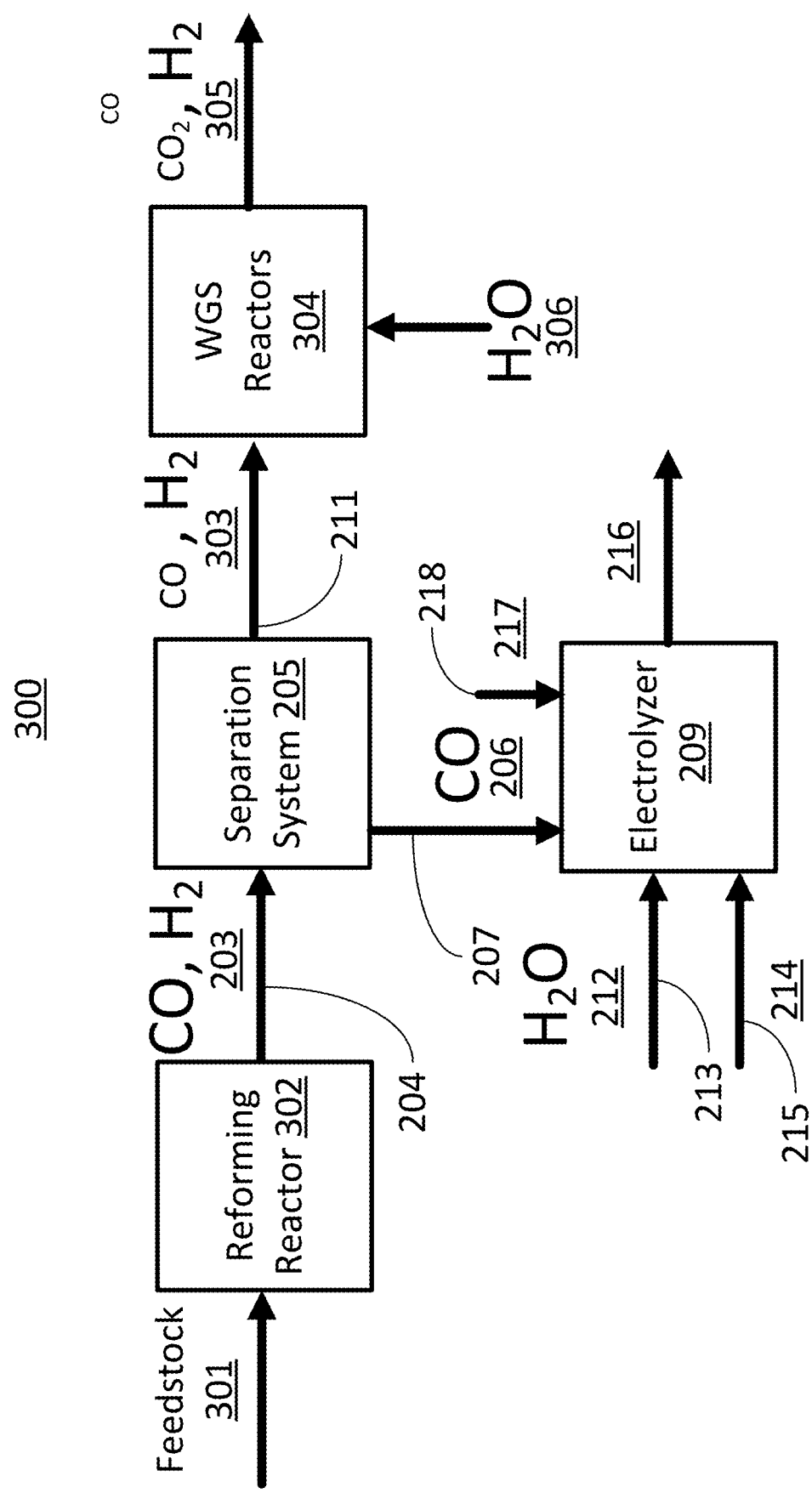
FIG. 3A illustrates a system for augmenting a syngas production system which includes a water gas shift reactor in accordance with specific embodiments of the inventions disclosed herein.

In specific embodiments of the invention, some of the carbon monoxide from an original feedstock is sent to an electrolyzer and some of it is sent to a water gas shift reactor. FIG. 3A illustrates a system 300 in which a feedstock 301 (e.g., natural gas) is provided to a syngas production system in the form of a reforming reactor 302. Subsequently, a portion of that carbon monoxide 303 is provided via third connection 211 to a water gas shift reactor 304 which will produce additional dihydrogen gas and carbon dioxide 305 from the carbon monoxide 303 and water 306. While this approach will produce carbon dioxide, specific embodiments of the invention discussed below can utilize this carbon dioxide as described below such that it does not need to be captured and sequestered.

Figure 3B:
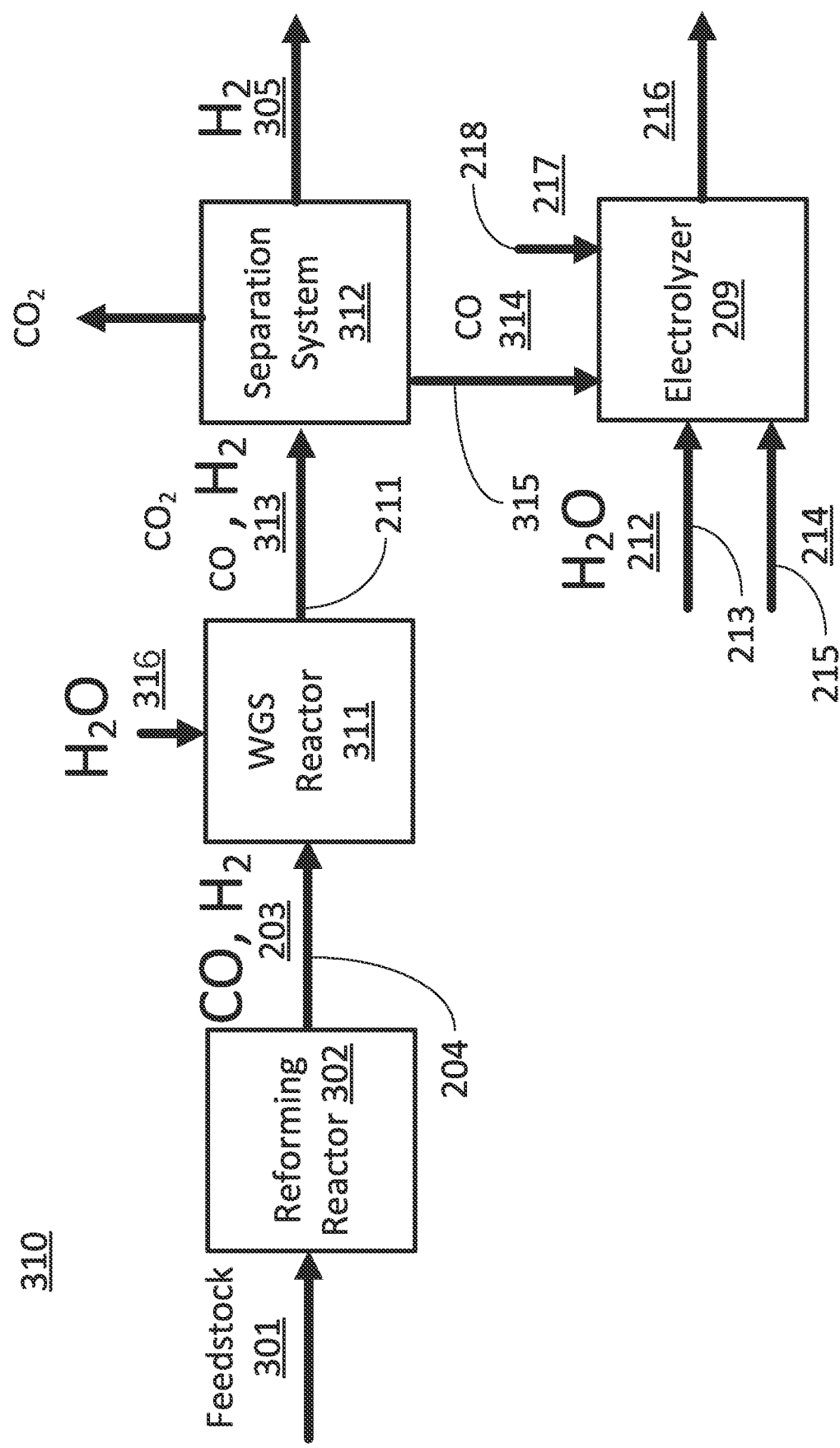
FIG. 3B illustrates another system for augmenting a syngas production system which includes a water gas shift reactor in accordance with specific embodiments of the inventions disclosed herein.

In specific embodiments of the invention, the carbon monoxide derived from an original feedstock is sent directly to a water gas shift reactor and the outputs of the water gas shift reactor are sent to a separation system where the remaining carbon monoxide can be separated and fed to an electrolyzer. FIG. 3B illustrates a system 310 in which a feedstock 301 is provided to a syngas production system in the form of a reforming reactor 302. Subsequently, all the syngas produced by the reforming reactor 302 is supplied to a water gas shift reactor 311 which also receives a volume of water 316. The output 313 of the WGS reactor 311 is in the form of dihydrogen gas mixed with carbon dioxide and carbon monoxide. Output 313 can then be applied to a separation system 312 which provides carbon monoxide 314 along a connection 315 to an electrolyzer 209 where it can be converted to useful feedstocks as described with reference to FIG. 2A. In specific embodiments of the invention, the reforming reactor can conduct a DMR or ATR reaction which uses carbon dioxide as an input, and the carbon dioxide generated by the water gas shift reactor 311 can be separated out and fed back as an input to reforming reactor 302 as described below.

In specific embodiments of the invention, the syngas evolution process can be a reforming process such as an autothermal or dry reforming process, such as a DMR process conducted on natural gas. These processes have the added advantage, from an environmental standpoint, of using carbon dioxide as an input such that the process serves to capture carbon dioxide as well as providing the environmental benefits already described above. These processes can be referred to as carbon-dioxide consuming reforming processes and the associated systems can be referred to as carbon dioxide consuming reforming systems. In specific embodiments of the invention, the syngas production system can be a dry methane reforming system and can conduct a dry methane reforming process on the volume of natural gas and the volume of carbon dioxide. The syngas production system can be configured to produce a volume of syngas using both the volume of natural gas and the volume of carbon dioxide.

Figure 4A:
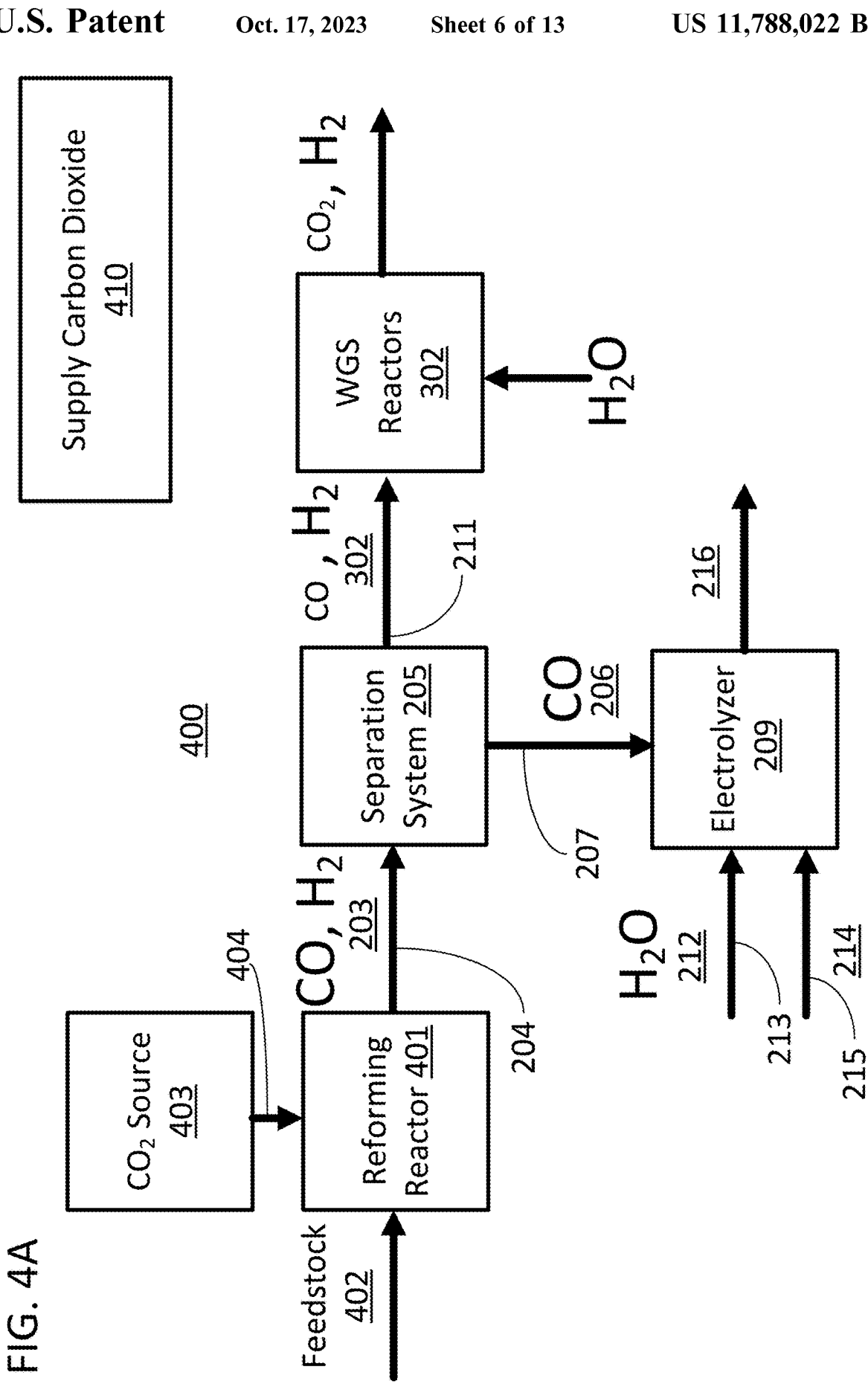
FIG. 4A illustrates a system for augmenting a syngas production system using a reformation reactor in accordance with specific embodiments of the inventions disclosed herein.

In system 400 of FIG. 4A, the syngas production system is a reforming reactor 401 such as a dry methane reforming reactor or an autothermal reforming reactor. FIG. 4 also includes a step 410 of supplying a volume of carbon dioxide to be used by the syngas production system which can be conducted prior to the commencement of the steps of flow chart 100. For example, feedstock 402 could be methane and the reforming reactor 401 could be a DMR reactor which receives both feedstock 402 and carbon dioxide from a carbon dioxide source 403 on a connection 404.

The carbon dioxide for the dry reforming process can be provided from various carbon dioxide sources. For example, the carbon dioxide source could be captured from a carbon emitting process in another industrial process happening in the same single industrial facility as the dihydrogen or syngas production line for which carbon dioxide capture is desired. As another example, the dihydrogen production line could include a water gas shift reactor as in FIG. 4A, and the carbon dioxide produced from that reaction could be fed back as at least part of the carbon dioxide source 403. In these embodiments, both the harvesting step 101 and the supply steps 410 could occur in the single industrial facility. These processes could include a connection, such as connection 404, fluidly connecting a carbon dioxide output of the carbon dioxide emitting source (represented by carbon source 403) to the syngas production system (e.g., reforming reactor 401). In these embodiments, an existing connection used to emit carbon dioxide could be repurposed for providing carbon dioxide to a syngas production system although this can only be done to a certain extent depending on the targeted H$_2$:CO ratio. In alternative embodiments, the volume of carbon dioxide could be from a carbon dioxide storage tank storing carbon that was emitted at a different time or at a different facility (represented by carbon source 403). For example, carbon dioxide source 403 could be a storage tank or a carbon dioxide transportation pipeline.

Figure 4B:
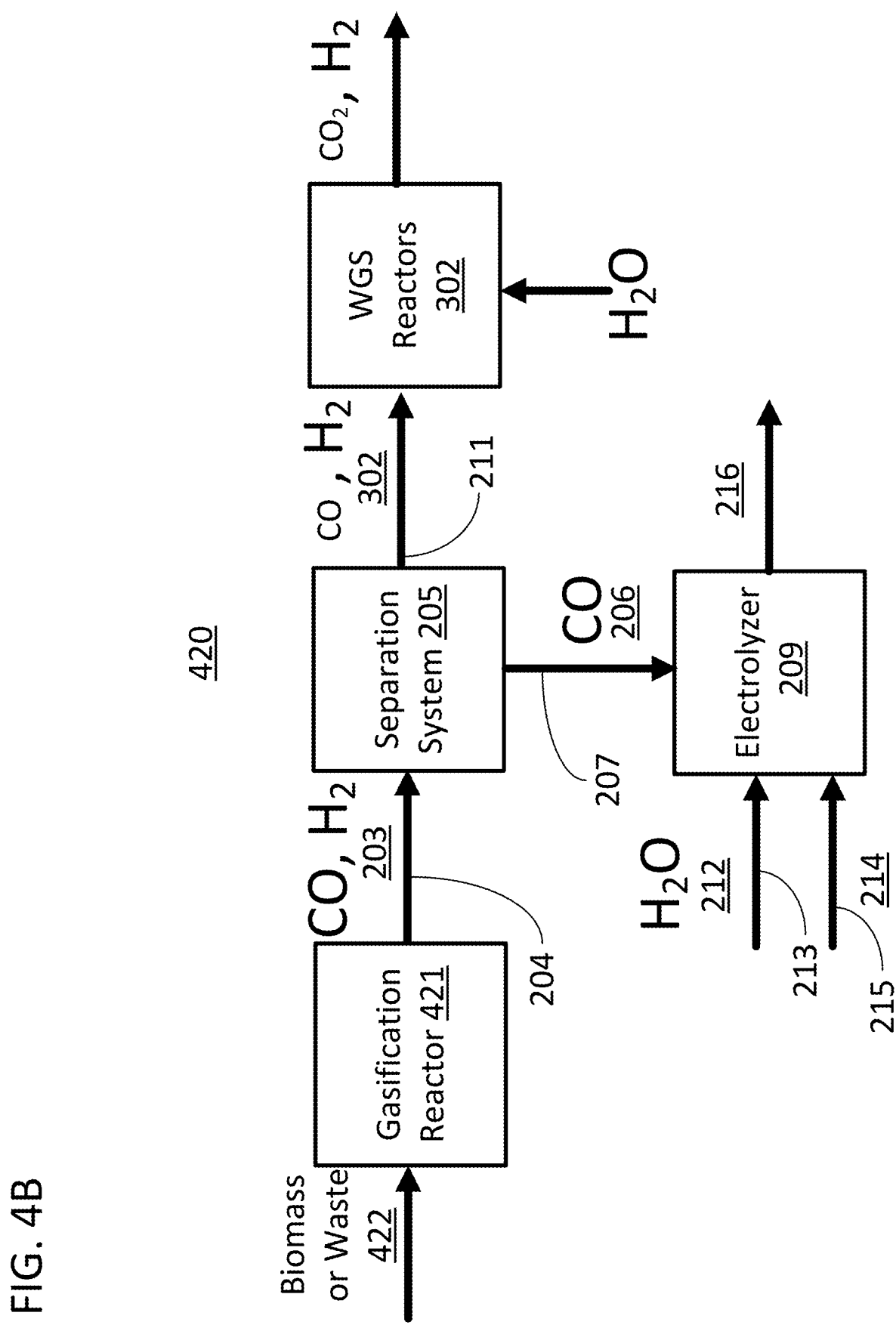
FIG. 4B illustrates a system for augmenting a syngas production system using a gasification reactor in accordance with specific embodiments of the inventions disclosed herein.

In system 420 in FIG. 4B, the syngas production system is a partial oxidation reactor 453 and the feedstock is an appropriate feedstock for a gasification reactor such as biomass or carbon-containing waste 422. The remaining elements of the system in FIG. 4B can be similar to those referenced with respect to FIGS. 2A, 3, and 4A. In alternative embodiments, the water gas shift reactor 302 can be replaced with a Fischer-tropsch reactor followed by an upgrade reactor to upgrade the crude to usable fuel. Such a system could enable the production of sustainable aviation fuels. In particular, the carbon dioxide produced by the illustrated WGS reactor 302 can be fed back as an input to the partial oxidation reactor 453.

Figure 4C:
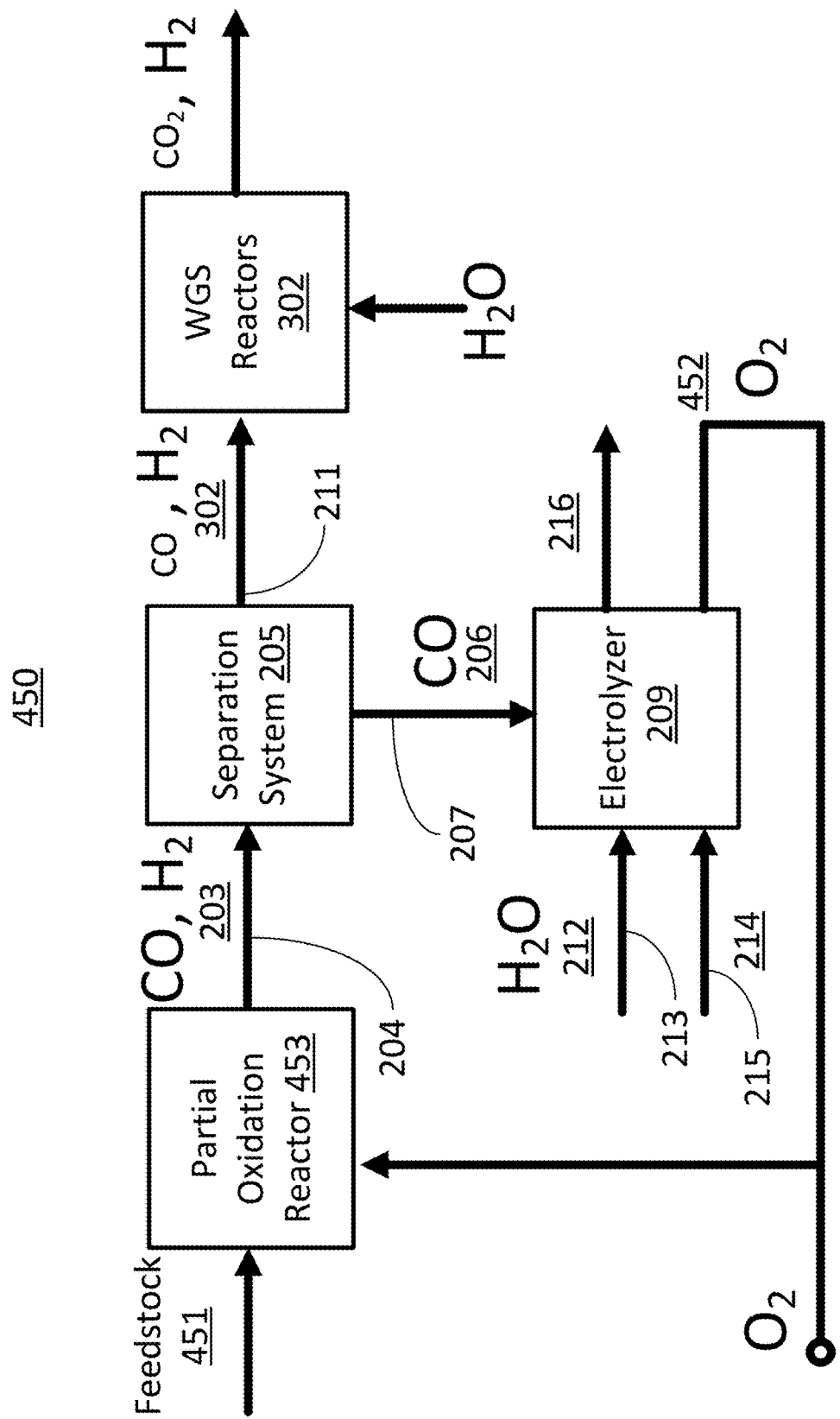
FIG. 4C illustrates a system for augmenting a syngas production system using oxygen collected from an output of an electrolyzer as an input to a partial oxidation reactor in accordance with specific embodiments of the inventions disclosed herein.

In system 450 in FIG. 4C, the syngas-production system is an oxidation reactor 421 and the feedstock is an appropriate feedstock for an oxidation reactor such as methane 451 and oxygen 452. In system 450, oxygen 452 can be oxygen harvested from electrolyzer 209 on an anodic output of the electrolyzer. As illustrated, the oxygen can include additional oxygen provided from a separate source as the harvested oxygen would generally not be enough to continue to adequately supply the oxidation reactor. The oxygen can be generated as the electrolyzer oxidizes water that is supplied to an anodic input of the electrolyzer. The oxidation reactor can conduct a partial oxidation process. In alternative embodiments, the oxygen generated by the electrolyzer oxidizing the water that is supplied to the anodic input can be valorized in a separate process or it can be isolated and stored. The stored oxygen can then be sold as, for example, purified oxygen.

Figure 4D:
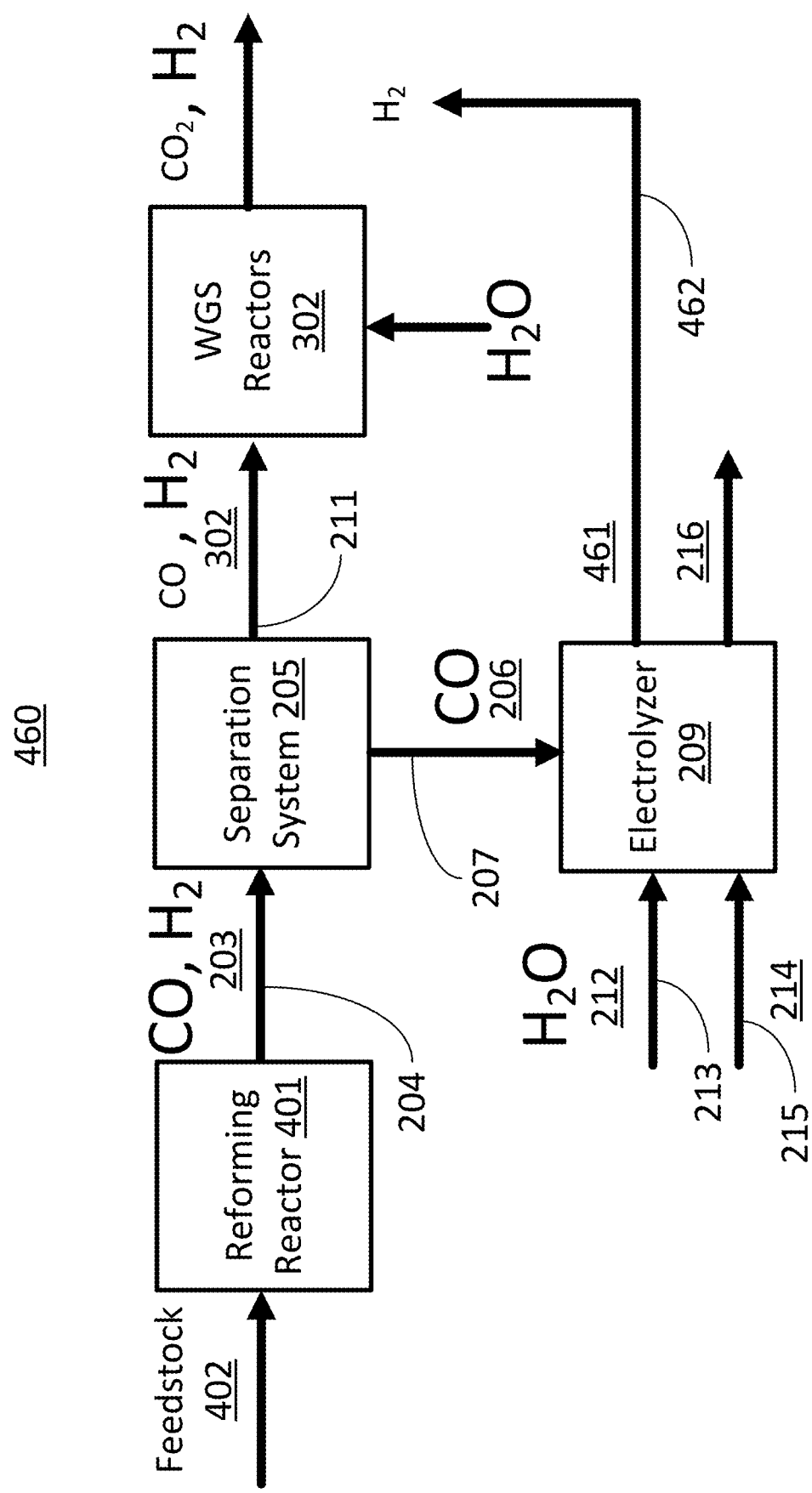
FIG. 4D illustrates a system for augmenting a syngas production system using parasitic hydrogen collected from an output of an electrolyzer to boost the production of dihydrogen by the system in accordance with specific embodiments of the inventions disclosed herein.

In system 460 in FIG. 4D, the syngas production system can have an increased concentration of dihydrogen in the produced syngas, or a larger volume of purified dihydrogen, using a parasitic output of the electrolyzer. As illustrated, electrolyzer 209 can produce parasitic dihydrogen 461 in the cathode area of the electrolyzer and output it on a cathodic output the electrolyzer and routed via a connection 462 to augment the production of hydrogen by the WGS reactor 302, or any other system which is utilized to product dihydrogen in the overall system to which the electrolyzer is a part. The dihydrogen can be separated from useful products 216 which are also output on the cathodic output produced on 216. For example, if the useful products were fluids, they could be separated via a trap on connection 462 while gaseous dihydrogen was kept in the connection.

In specific embodiments of the present invention, the syngas production device is advantageously integrated with a carbon monoxide electrolyzer comprising a cathode area where carbon monoxide reduction takes place according to equation 16 below and an anode area where an oxidation reaction takes place on an oxidation substrate. The oxidation substrate can be water, dihydrogen gas, halides, organic waste or any other oxidation substrate. For example, the oxidation can involve water oxidation or dihydrogen oxidation according to equations 17 and 18 below respectively.

$$xCO+(x+y-z)H_2O+(2x+y-2z)e^- \rightarrow C_xH_yO_z+(2x+y-2z)OH^- \quad (16)$$

$$2H_2O \rightarrow 4H^++4e^-+O_2 \quad (17)$$

$$H_2 \rightarrow 2H^++2e^- \quad (18)$$

Both the carbon monoxide and the oxidation substrate can be mixed with additional chemicals to alter the characteristics of the reactor and change the characteristics of the chemicals produced by the electrolyzer. For example, and with reference to FIG. 2A, water (not shown) and carbon monoxide 206 can be combined to form a cathodic input fluid for electrolyzer assembly, while an oxidation substrate 214 such as dihydrogen is provided on another connection 215 coupled to an anode input of the electrolyzer.

The chemicals produced by the electrolyzer can vary in different embodiments of the invention. The chemicals can be separated using a separating element such as a trap for liquid chemicals on the anodic or cathodic output of the electrolyzer or a separating area between the cathode area and anode area which has its own output from the electrolyzer. The chemicals produced can be removed from the electrolyzer in solid or gaseous form and can be removed from the cathodic or anodic output streams on the cathode or anode outputs of the electrolyzer, or from a separate output from a separating layer. Examples of such a separating layer are provided below. A single electrolyzer can produce chemicals in both gaseous and liquid forms simultaneously. Accordingly, the volume of chemicals generated in a step such as step 103 could include at least one of a volume of hydrocarbons, a volume of organic acids, a volume of alcohols, a volume of olefins and a volume of N-rich organic compounds, where the chemicals are in gaseous or liquid form. For example, the volume of generated chemicals could include a volume of gaseous hydrocarbon and a volume of liquid alcohol. As another example, the volume of generated chemicals could include a volume of gaseous hydrocarbons and a volume of organic acids. In a specific embodiment, the main targeted products are ethylene (in the gaseous product stream) and acetic acid/acetate (in the liquid product stream).

In situations such as the production of low-carbon dihydrogen gas where a water gas shift reaction would otherwise take place, such a system is particularly advantageous since it enables the valorization of the carbon monoxide prior to its conversion to carbon dioxide, otherwise occurring during water gas shift reaction. As a result, the system unlocks the production of a low-carbon SMR-derived dihydrogen (analogous to blue hydrogen) without the need for a carbon capture and sequestration facility. Additionally, it enables the co-production of valuable carbon-based feedstocks with a low carbon footprint compared to those traditionally produced through oil-derived processes (such as, but not limited to, naphtha cracking and ethane dehydration).

In specific embodiments of the invention, the oxidation substrate is dihydrogen gas, and the dihydrogen gas is supplied from the syngas production process. The system could include a second output from the separating system that separates out the dihydrogen from the syngas, and a connection fluidly connecting the second output of the separating system to an anode area of the electrolyzer. For example, the second output could be drawn from separation system 205 and connect to connection 215 in FIG. 2A. The process conducted by the system could then comprise separating a second volume of dihydrogen from the volume of syngas. The generating of useful chemicals by the electrolyzer using the volume of carbon monoxide could then comprise supplying the volume of carbon monoxide to a cathode area of the electrolyzer as a cathodic input fluid and supplying the second volume of dihydrogen to an anode area of the electrolyzer as an anodic input fluid.

Figure 5:
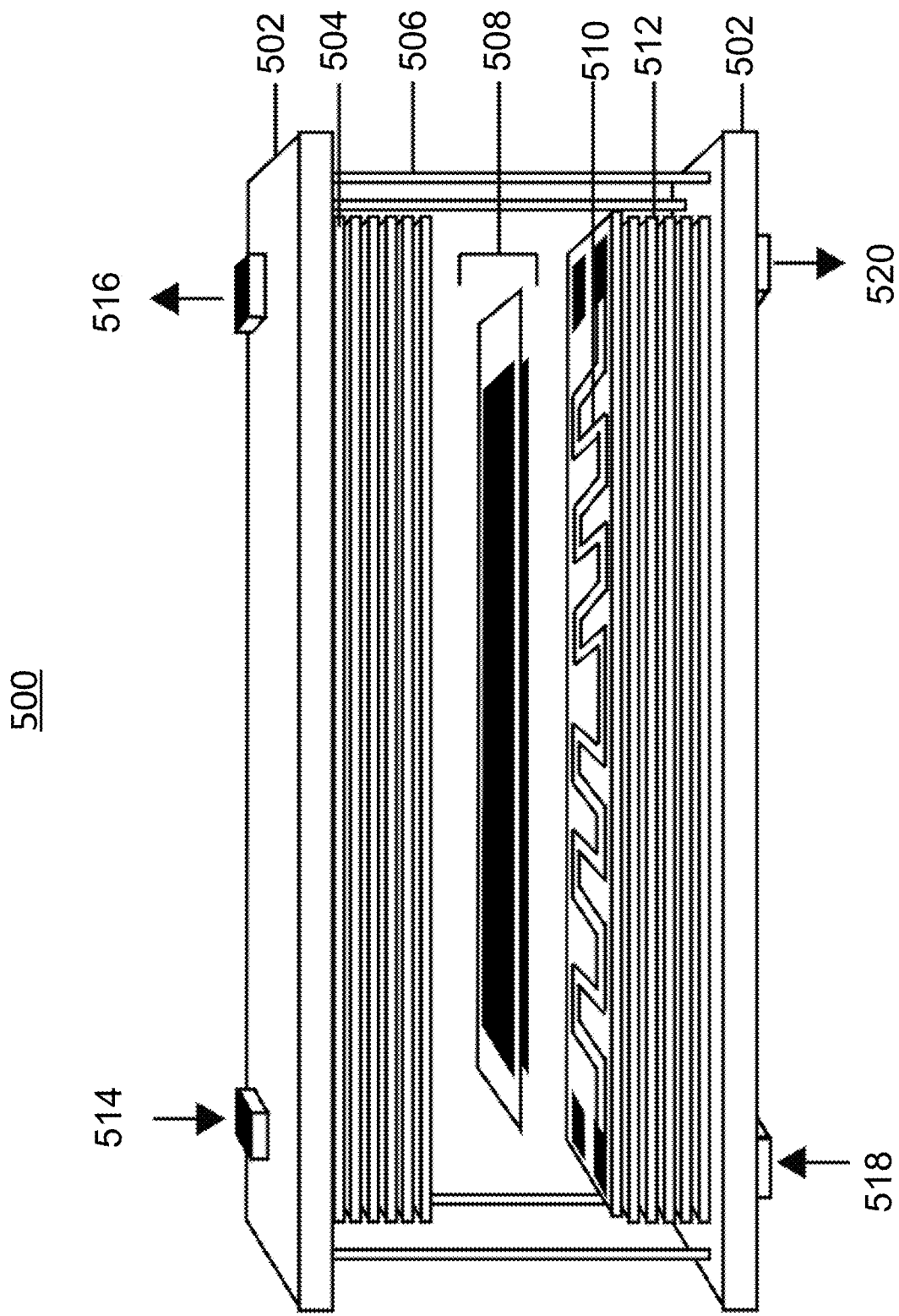
FIG. 5 illustrates an exploded view of an electrolyzer that can be utilized in accordance with specific embodiments of the inventions disclosed herein.

The carbon monoxide electrolyzer used in accordance with this disclosure can comprise one or more electrocatalytic cells positioned on top or next to one another to increase the surface available for the reaction. They can be stacked on top of one another, and such stacks can also be parallelized. These cells may be connected in series or in parallel. Many different cell and stack configurations can be used for the electrolyzers in accordance with this disclosure. FIG. 5 provides a diagram of an electrolyzer 500 for explanatory purposes. The methods and systems disclosed herein are broadly applicable to electrolyzers that can receive carbon inputs such as carbon monoxide generally and electrolyzer 500 is provided as a nonlimiting example of one such electrolyzer.

FIG. 5 includes an illustration of an electrolyzer 500 in the form of a stack in accordance with specific embodiments of the invention disclosed herein. The electrolyzer assembly 500 includes end plates such as 502, monopolar plates such as 504, rigid bars such as 506, a membrane electrode assembly (MEA) such as 508 or any form of catalytic core, a flow field such as 510, and bipolar plates such as 512. Again, while the example of an MEA is being provided, this is only an example, and electrolyzers with any form of catalytic core can be used in accordance with the embodiments disclosed herein. Additionally, the stack 500 includes an inlet 514 and an outlet 516 for an anodic stream, as well as an inlet 518 for a cathodic stream and an outlet 520 for the cathodic stream. The polar plates, such as monopolar plate 504 and bipolar plate 512 can be part of the cells in the stack. The stack can also comprise gasketing, sealing of any shape and materials that have not been represented in the FIG. 5 for clarity.

In an electrolysis stack, subsequent cells can be physically separated by bipolar plates (BPPs), such as bipolar plate 512 in FIG. 5, that can ensure mechanical support for each of the electrolysis cells on each side of the BPP. BPP can also ensure electrical series connection between subsequent electrolysis cells and introduce/remove the reactants/products respectively. At the end of the stack, only one side of the plate can be in contact with the terminal cell; it is then called a monopolar plate, such as monopolar plate 504 in FIG. 5. At the extremities of the stack, current collectors can allow connection to an external power supply, which can also be used, among other elements, for electrical monitoring of the stack. The stack can be assembled within a stack casing allowing its mechanical support and compression, as well as provisioning and transporting the reactant and product streams to and from the stack. The stack casing can comprise end plates that ensure electrical isolation of the stack and provide the inlet and outlets for the reactant and product streams. Alternatively, insulator plates can be placed between end plate such as 502 and the monopolar plate such as 504 to ensure electrical insulation of the stack versus the stack casing depending on the material of the end plate.

The carbon monoxide electrolyzers can take as an input, a cathodic input stream (e.g., stream enriched in carbon monoxide) and an anode input stream. The cathodic input stream can be provided to an inlet such as inlet 518. The anodic input stream can be provided to an inlet such as inlet 514. The cathodic stream and anodic stream can flow through the stack from the inlets to the outlets and be distributed through the flow channels, such as flow channel 510 of each cell to each cathodic and anodic area separately. The anodic stream and cathodic stream would flow through separate channels on either side of the cell. Alternatively, at least one of the cathodic and anodic streams may be provided to each cell individually instead of through a connection crossing all the plates. In this case, each cell has a dedicated fluid inlet and outlet for this cathodic and/or anodic stream. The nature of the anodic stream can be determined by the nature of the targeted oxidation reaction (such as, but not limited to, water oxidation, dihydrogen oxidation, chloride oxidation, halide oxidation, hydrocarbon oxidation, waste organic oxidation). When electrically powered, the carbon monoxide electrolyzer carries out the concomitant reduction of carbon monoxide and oxidation of the chosen oxidation substrate to produce added-value chemicals such as hydrocarbons, organic acids and/or alcohols and/or N-containing organic products in the output cathodic stream separated from the anodic stream where the oxidation products are specifically collected. For example, the generating of chemicals using carbon monoxide and the electrolyzer in step 103 could involve supplying the volume of carbon monoxide to a cathode area of the electrolyzer as a cathodic input fluid and supplying a volume of water to an anode area of the electrolyzer as an anodic input fluid.

In specific embodiments of the invention, the anode area could comprise an anodic catalyst layer able to oxidize a substance to produce a product and protons. The catalyst can comprise one or more: molecular species, single-metal-site heterogeneous compounds, metal compounds, carbon-based compounds, polymer electrolytes (also referred to as ionomers), metal-organic frameworks, metal-doped covalent organic framework or any other additives. The molecular species can be selected from metal porphyrins, metal phthalocyanines or metal bipyridine complexes. The metal compound can be under the form of metal nanoparticles, nanowires, nano powder, nanoarrays, nanoflakes, nanocubes, dendrites, films, layers or mesoporous structures. The single-metal-site compounds can comprise a metal-doped carbon-based material or a metal-N—C-based compound. Anodic catalyst species used for this purpose could include, but are not limited to, metals and/or ions of: Ir, Co, Cu, Ni, Fe, Pt, Rh, Re, Ru, Pd, Os, Mo and mixture and/or alloys thereof. For example, the anodic catalyst could be Ni such that the electrolyzer assembly included a nickel-based anode. The polymer electrolyte can be selected out of the same materials as the one used for the described membranes. The carbon-based compounds can comprise carbon nanofibers, carbon nanotubes, carbon black, graphite, boron-doped diamond powder, diamond nanopowder, boron nitride or a combination thereof. The additives can be halide-based compounds including F, Br, I, and Cl. The additives can be specifically dedicated to modify hydrophobicity such as treatment with polytetrafluoroethylene (PTFE) or carbon black.

The anodic catalyst may be deposited onto a gas diffusion layer or a porous transport layer or any other support that facilitates the diffusion of gas from the interface of the anode to a purified gas stream separated from the cathodic stream. The anode area could also include a gas diffusion layer with one or more separators such as but not limited to membranes, polymeric materials, diaphragm, inorganic material on its borders as described below.

In specific embodiments of the invention, the cathode area could comprise a catalyst layer able to reduce a substance (e.g., carbon monoxide) to generate value-added hydrocarbons/alcohols/organic acids. The catalyst can comprise one or more: molecular species, single-metal-site heterogeneous compounds, metal compounds, carbon-based compounds, polymer electrolytes (also referred to as ionomers), metal-organic frameworks, or metal-doped covalent organic frameworks or any other additives. The molecular species can be selected from metal porphyrins, metal phthalocyanines or metal bipyridine complexes. The metal compound can be under the form of metal nanoparticles, nanowires, nano powder, nanoarrays, nanoflakes, nanocubes, dendrites, films, layers or mesoporous structures. The single-metal-site compounds can comprise a metal-doped carbon-based material or a metal-N—C-based compound The cathode catalyst may be made of a metal or metal ion from metals such as, but not limited to, Cu, Ag, Au, Zn, Sn, Bi, Ni, Fe, Co, Pd, Ir, Pt, Mn, Re, Ru, La, Tb, Ce, Dy or other lanthanides and mixture and/or alloys thereof. For example, the cathodic catalyst could comprise Cu such that the electrolyzer assembly included a copper-based cathode. The polymer electrolyte can be selected out of the same materials as the one used for the described membranes. The carbon-based compounds can comprise carbon nanofibers, carbon nanotubes, carbon black, graphite, boron-doped diamond powder, diamond nanopowder, boron nitride or a combination thereof. The additives can be halide-based compounds including F, Br, I, Cl. The additives can be specifically dedicated to modify hydrophobicity such as treatment with PTFE or carbon black. The cathode may further comprise a catalyst layer on a gas diffusion layer, a porous transport layer, or any other support, which encourages the diffusion of the gas from a stream to the surface of the catalyst, as well as allowing the release of non-reacted/product gases. The cathode area could also include a gas diffusion layer with one or more separators such as, but not limited to, membranes, polymeric materials, diaphragms, and inorganic materials on its borders as described below.

In specific embodiments of the invention, the porous support for either the anode area, the cathode area, or both, can be selected from carbon-based porous supports or metal-based porous material or a combination. The carbon-based porous support can be based on carbon fibers, carbon cloth, carbon felt, carbon fabric, carbon paper, molded graphite laminates and the like or a mixture thereof. The carbon-based porous support can be a gas diffusion layer with or without microporous layer. Such carbon-based support can be in particular chosen in the among the following list: Sigracet 39AA, Sigracet 39BC, Sigracet 39BB, Sigracet 39BA, Sigracet 36AA, Sigracet 36BB, Sigracet 35BC, Sigracet 35BA, Sigracet 29BA, Sigracet 28BB, Sigracet 28AA, Sigracet 28BC, Sigracet 25BC, Sigracet 22BB, Sigracet 35B1, Toray papers, Toray THP-H-030, Toray TGP-H-060, Toray TGP-H-090, Toray TGP-H-120, Freudenberg H23C6, Freudenberg H15C13, Freudenberg H15C14, Freudenberg H14C10, Freudenberg H14CX483, Freudenberg H14CX653, Freudenberg H23C2, Freudenberg H23CX653, Freudenberg H24CX483, Freudenberg H23C6, Freudenberg H23C8, Freudenberg H24C5, Freudenberg H23C3, Avcarb MB-30, Avcarb GDS5130, Avcarb GDS2130, Avcarb GDS3250, Avcarb GDS3260, Avcarb GDS2230, Avcarb GDS2240, Avcarb GDS2255, Avcarb GDS2185, AvCar 1071, AvCarb 1698, AvCarbon1209, AvCarb 1185, AvCarb1186, AvCarb 7497, AvCarb T1819, AvCarb T1820, AvCarb T1824, AvCarbon 1071, AvCarb 1698, AvCarb 1209, AvCarb 1185, AvCarb 1186, AvCarb 1186, AvCarb T1819, AvCarb T1820, AvCarb T1824, AvCarb EP40, AvCarb P75, AvCarb EP55, AvCarbon EP40T, AvCarb P75T, AvCarb EP55T, AvCarb MGL190, AvCarb MGL280, AvCarbMGL370. The metal-based porous support can be selected from titanium, stainless steel, Ni, Cu or any other suitable metal and can be under the form of mesh, frit, foam or plate of any thickness or porosity.

In specific embodiments of the invention, the electrolyzer can include a separating element to separate specific generated chemicals from others. The separating element can be one or more traps on the cathodic and/or anodic outputs of the electrolyzer which separates liquid outputs from gaseous outputs. It can also be more complex systems known by those skilled in the art for the purpose of efficient product separation. The separating element can be a separating area between the anode area and the cathode area configured to separate the volume of generated chemicals from the electrolyzer. The separating area can be a separating layer. Efficient physical separation of the anode area and cathode area may allow easier separation of the gases released from each section of the reactor. The separator can be an ion-conducting polymeric separator, a non-ion conducting polymeric separators, a diaphragm, a ceramic-containing material, a non-charged separator scaffold, a mixed ceramic-organic compound separator, or any other separator. Separation may occur through the use of ion-exchange membranes, which favor the diffusion of either anions (in an anion-exchange membrane) or cations (in a cation-exchange membrane), or a bipolar membrane (including a mixture of cation- and anion-exchange membranes) or other types of separators, such as diaphragms, ceramic-containing materials (in particular mixed ceramic/organic compounds), or non-charged separator scaffolds. Anion-exchange membrane can comprise an organic polymer with positively charged functionality, such as, but not limited to, imidazolium, pyridinium or tertiary amines. This allows facile migration of negatively charged hydroxide ions ($OH^-$) produced during carbon monoxide reduction from the cathode to the anode. The use of this layer also prevents the crossover of other gases from the cathode to the separating layer. Cation-exchange membranes can comprise an organic polymer with negatively charged functionality such as, but not limited to, sulfonate groups. Diaphragms or non-charged separators can be materials derived from insulating materials which may be charged with an ion-conducting electrolyte to facilitate charge transfer between electrodes. Ceramic-containing materials may be a purely ceramic or mixed polymer and ceramic material. Ceramic-polymer mixes can reach higher temperatures than purely organic polymers and may take advantage of ion-exchange functionality in the polymer to pass charge between electrodes.

In specific embodiments of the invention, the system can include an electrolyte that will facilitate the transportation of ions and provide ions that promote the reactions. In particular, the electrolyte may be a concentrated alkaline solution such as a solution of hydroxide-containing salt such as but not limited to potassium, sodium or cesium hydroxide with concentrations such as (0.01 molarity (M), 0.05 M, 0.1 M, 0.2 M, 0.5 M, 1 M, 2 M, 3 M, 4 M, 5 M, 6 M, 7 M, 8 M, 9 M and 10 M). The use of concentrated alkaline solution brings down the energy requirement of the overall reaction. Alkali metal cations (such as Li, Na, K, Cs, Rb) may be used as counter-cations.

Figure 6:
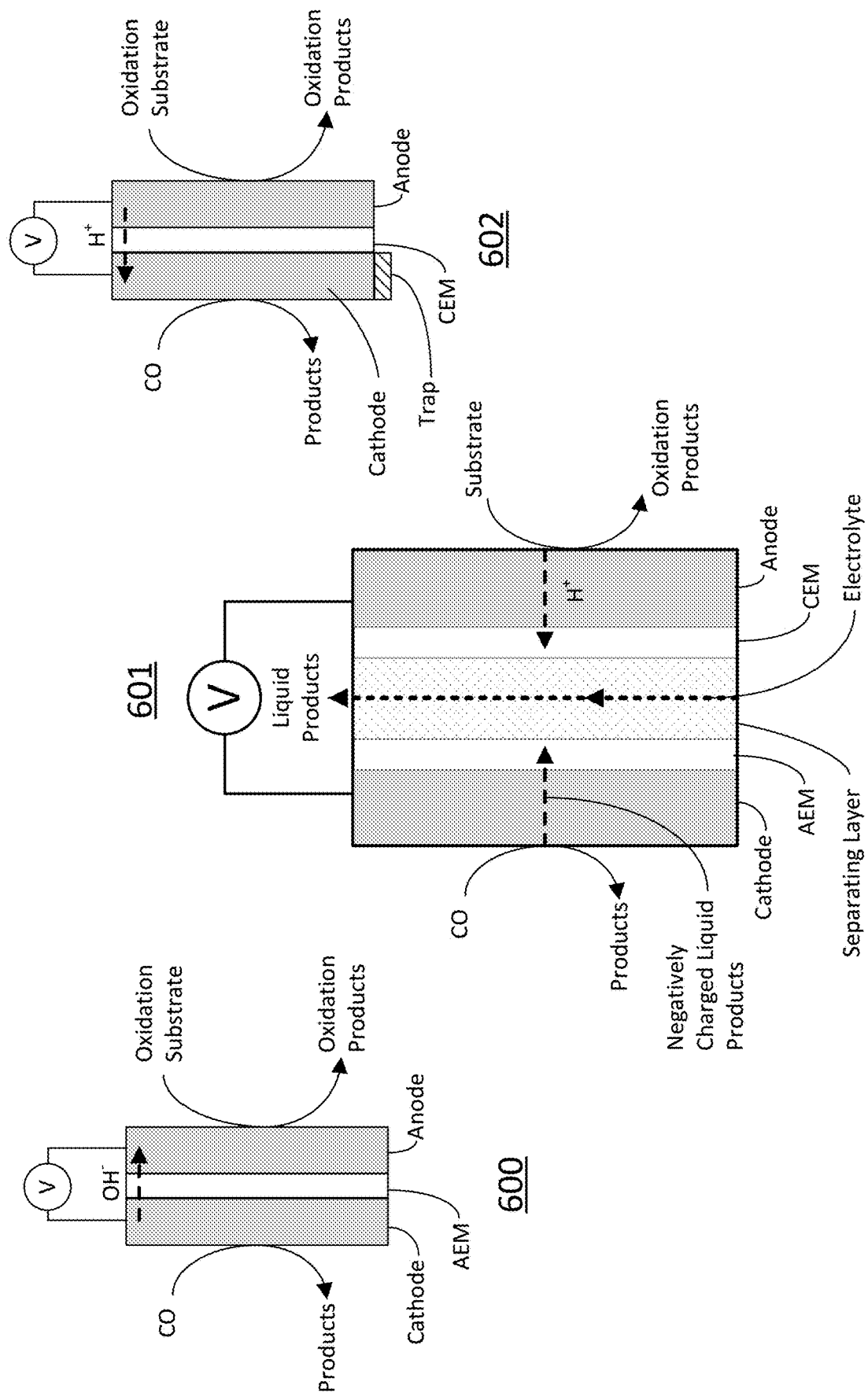
FIG. 6 illustrates a set of electrolyzer reactions that can be utilized in accordance with specific embodiments of the inventions disclosed herein.
Figure 7:
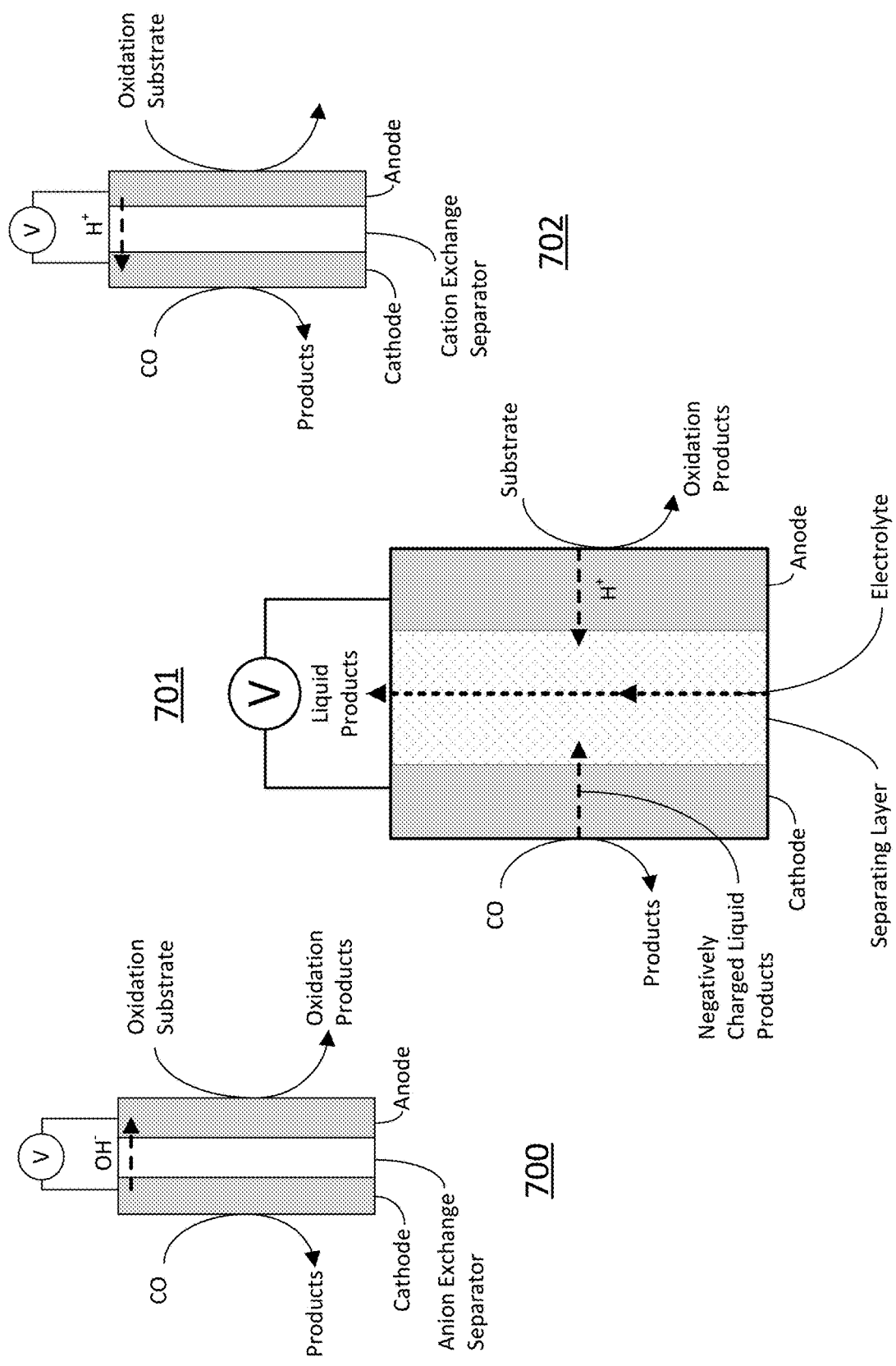
FIG. 7 illustrates a second set of electrolyzer reactions that can be utilized in accordance with specific embodiments of the inventions disclosed herein.

In specific embodiments of the invention, the flow field can comprise a ladder, single or multiple serpentines, interdigitated patterns, pillars, bio-inspired leaf-like shapes or a mixture thereof. An electrolysis cell can also include polar plates as further discussed in this disclosure FIGS. 6 and 7 illustrate examples of reactions that can be conducted in accordance with the electrolyzer assemblies described herein. In the diagrams, only single cells are represented for clarity but these could easily assembled in a plurality of cells such as in a stack. In the diagrams, a carbon monoxide electrolyzer comprises a cathode comprising a gas-diffusion layer and a copper-based catalyst, and the anode comprises a nickel material of any shape (such as but not limited to a foam, a mesh, a deposit onto a conductive porous transport layer (PTL), etc.). In this case, the carbon monoxide reduction products include one or more of the following: ethylene ($C_2H_4$), ethanol ($C_2H_5OH$), acetic acid ($CH_3COOH$), propylene ($C_3H_6$), propanol ($C_3H_8O$), oxalic acid (COOH—COOH), acrylic acid ($C_2H_3COOH$), glyoxylic acid (COH—COOH) produced according to the following carbon monoxide reduction reactions:

In neutral/alkaline conditions:

$$2CO + 6H_2O + 8e^- \rightarrow CH_2CH_2 + 8OH^- \quad (19)$$

$$2CO + 7H_2O + 8e^- \rightarrow CH_3CH_2OH + 8OH^- \quad (20)$$

$$2CO + 4H_2O + 4e^- \rightarrow CH_3COOH + 4OH^- \quad (21)$$

$$3CO + 5H_2O + 6e^- \rightarrow C_2H_3COOH + 6OH^- \quad (22)$$

$$3CO + 9H_2O + 12e^- \rightarrow C_3H_6 + 12OH^- \quad (23)$$

$$3CO + 10H_2O + 12e^- \rightarrow C_3H_8O + 12OH^- \quad (24)$$

In acidic conditions:

$$2CO + 8H^+ + 8e^- \rightarrow CH_2CH_2 + 2H_2O \quad (25)$$

$$2CO + 8H^+ + 8e^- \rightarrow CH_3CH_2OH + H_2O \quad (26)$$

$$2CO + 4H^+ + 4e^- \rightarrow CH_3COOH \quad (27)$$

$$3CO + 6H^+ + 6e^- \rightarrow C_2H_3COOH + H_2O \quad (28)$$

$$3CO + 12H^+ + 12e^- \rightarrow C_3H_6 + 3H_2O \quad (29)$$

$$3CO + 12H^+ + 12e^- \rightarrow C_3H_8O + 2H_2O \quad (30)$$

In specific embodiments, the CO stream is mixed with other gas or liquid compounds to generate higher added value products at the cathode. In one such embodiment, imines, amines, nitrogen oxides or ammonia are added to react with CO, or an intermediate formed during its reduction, to form amide bonds or N-rich organic compounds, such as amino acids or urea. Examples of such reactions are:

$$2CO + 3H_2O + NH_3 + 4e^- \rightarrow CH_3CONH_2 + 4OH^- \text{ in neutral/alkaline conditions} \quad (31)$$

$$2CO + 4H^+ + NH_3 + 4e^- \rightarrow CH_3CONH_2 + H_2O \text{ in acidic conditions} \quad (32)$$

In specific embodiments, the oxidation reaction at the anode is selected from the group consisting of reactions undertaken in an acidic environment and reactions undertaken in an alkaline environment such as but not limited to anodic reactions in an acidic environment such as:

$$2H_2O \rightarrow O_2 + 4H^+ + 4e^- \quad (33)$$

$$H_2 \rightarrow 2H^+ + 2e^- \quad (34)$$

$$Cl^- \rightarrow Cl_2 + 2e^- \quad (35)$$

$$Br^- \rightarrow Br_2 + 2e^- \quad (36)$$

$$I^- \rightarrow I_2 + 2e^- \quad (37)$$

$$C_3H_8O_3 \text{ (glycerol)} \rightarrow C_3H_6O_3 \text{ (glyceraldehyde)} + 2H^+ + 2e^- \quad (38)$$

$$C_3H_8O_3 \text{ (glycerol)} + H_2O \rightarrow C_3H_6O_4 \text{ (glycerate)} + 5H^+ + 4e^- \quad (39)$$

$$C_3H_8O_3 \text{ (glycerol)} + 3/2H_2O \rightarrow 3/2C_2H_3O_3^- + 13/2H^+ + 5e^- \quad (40)$$

$$C_3H_8O_3 \text{ (glycerol)} + 3H_2O \rightarrow 3HCOO^- \text{ (formate)} + 11H^+ + 8e^- \quad (41)$$

$$C_3H_8O_3 \text{ (glycerol)} + 3H_2O \rightarrow 3/2C_2O_4^{2-} + 14H^+ + 11e^- \quad (42)$$

and anodic reactions in neutral/alkaline environments such as:

$$4OH^- \rightarrow O_2 + 2H_2O + 4e^- \quad (43)$$

$$H_2 + 2OH^- \rightarrow 2H_2O + 2e^- \quad (44)$$

$$Cl^- \rightarrow Cl_2 + 2e^- \quad (45)$$

$$Br^- \rightarrow Br_2 + 2e^- \quad (46)$$

$$I^- \rightarrow I_2 + 2e^- \quad (47)$$

$$C_3H_8O_3 \text{ (glycerol)} + 2OH^- \rightarrow C_3H_6O_3 \text{ (glyceraldehyde)} + 2H_2O + 2e^- \quad (48)$$

$$C_3H_8O_3 \text{ (glycerol)} + 5\ OH^- \rightarrow C_3H_6O_4 \text{ (glycerate)} + 4H_2O + 4e^- \quad (49)$$

$$C_3H_8O_3 \text{ (glycerol)} + 13/2\ OH^- \rightarrow 3/2C_2H_3O_3^- + 5H_2O + 5e^- \quad (50)$$

$$C_3H_8O_3 \text{ (glycerol)} + 11OH^- \rightarrow 3HCOO^- \text{(formate)} + 8H_2O + 8e^- \quad (51)$$

$$C_3H_8O_3 \text{ (glycerol)} + 14OH^- \rightarrow 3/2C_2O_4^{2-} + 11H_2O + 11e^- \quad (52)$$

In specific embodiments of the invention, the carbon monoxide electrolyzer includes one or more membranes chosen among anion-exchange membranes (such as, but not limited to, commercial Ionomr®, Orion®, Sustainion®, Piperion®, ionomer anion-exchange membranes), proton-exchange membranes (such as but not limited to Nafion®, Aquivion® or commercial membranes), bipolar membranes (such as, but not limited to, Fumasep® FBM and Xion®). In specific embodiments of the invention, the membrane in an anion-exchange membrane is prepared using N-bearing monomers. In the example of reactor 600, the electrolyzer includes an anion exchange membrane and hydroxide moves from the cathode to the anode. The oxidation product depends on the oxidation substrate, while the product harvested from the cathode output can be any of the generated chemicals mentioned above. In the example of diagram 602, the electrolyzer includes a cation exchange membrane and protons move from the anode to the cathode. The oxidation product again depends on the oxidation substrate, while the product harvested from the cathode output can be any of the generated chemicals mentioned above.

In specific embodiments of the invention, the electrolyzer can include a separating layer. In the example of reactor 601, the carbon monoxide electrolyzer comprises a central separating layer in which an electrolyte fluid is circulated allowing the collection of liquid carbon-monoxide-reduction products that migrate from the cathode toward the central separating layer. In specific embodiments, the central separating layer is either separated from the cathode by an anion-exchange membrane or from the anode by a cation-exchange membrane, or both membranes are present. In the example of reactor 601, both membranes are present. In this example, useful products can be harvested both from the liquid stream in from the separating layer and a gaseous stream from the cathode output. For example, the carbon monoxide could be used by the electrolyzer to produce one or more of the following: ethylene ($C_2H_4$), ethanol ($C_2H_5OH$), acetic acid ($CH_3COOH$), propylene ($C_3H_6$), propanol ($C_3H_8O$). In a specific embodiment, the main targeted product is ethylene (in the gaseous product stream). In another specific embodiment, the main targeted products are ethylene (in the gaseous product stream) and ethanol (in the liquid product stream). In another specific embodiment, the main targeted products are ethylene (in the gaseous product stream) and acetic acid/acetate (in the liquid product stream). For example, in reactor 602, a trap is located at the cathodic output which separates liquid products from gaseous products such that they can both be collected. In these examples, the oxidation occurring at the anode could be water/hydroxide oxidation, dihydrogen oxidation, or chloride oxidation. Notably, in a physical system the trap is located on the connection to the outlet of the cathode such as to piping that is connected to the cathode, and the trap is drawn connected to the cathode area for diagrammatic purposes only.

The examples illustrated in FIG. 7 are similar to those of FIG. 6 in terms of the overall theory of the reactor. However, the approaches in FIG. 7 operate without the use of exchange membranes and instead operate with separating layers that achieve similar effects. Reactor 700 is similar to that of reactor 600 in that hydroxide ions move from the cathode to the anode and generated products can be harvested from the cathode output. Reactor 701 is similar to that of reactor 601 in that the separating layer includes a liquid electrolyte and useful products can be harvested both from the output of the separating layer in liquid form and from an output of the cathode area in fluid form. Reactor 702 is similar to reactor 602 in that protons migrate across the separating layer and useful products can be harvested from the output of the cathode.

Figure 8:
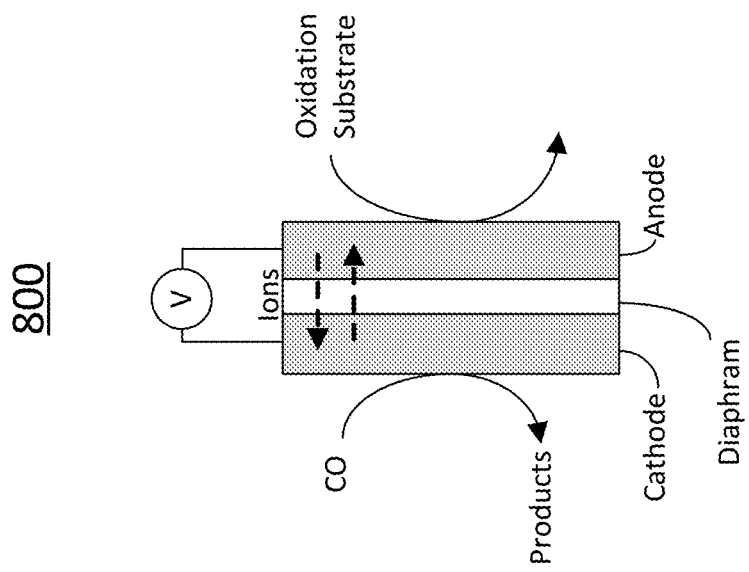
FIG. 8 illustrates an electrolyzer using a diaphragm as a separating element in accordance with specific embodiments of the inventions disclosed herein.

In specific embodiments of the invention, a porous diaphragm can be used in the electrolyzer as a separation element to achieve separation. The diaphragm can be saturated with an electrolyte which allows ions to cross between the cathode and anode. FIG. 8 shows reactor 800 in which the separation element is a diaphragm that allows ions to cross from the anode to the cathode and/or ions to cross from the cathode to the anode.

In specific embodiments of the invention, the syngas-producing system is a biomass gasification device used to produce low-carbon dihydrogen. The carbon monoxide is then separated from the produced dihydrogen and fed to a carbon monoxide electrolyzer to produce one or more of the following: ethylene ($C_2H_4$), ethanol ($C_2H_5OH$), acetic acid ($CH_3COOH$), propylene ($C_3H_6$), propanol ($C_3H_8O$) or products containing carbon-nitrogen bonds such as amino acids and/or urea and/or amide-containing organic species if N-containing species are used concomitantly to the CO as an input of the cathodic stream such asimines, amines, ammonia, nitrogen oxides. In a specific embodiment, the main targeted product is ethylene (in the gaseous product stream). In a specific embodiment, the main targeted products are ethylene (in the gaseous product stream) and ethanol (in the liquid product stream). The oxidation occurring at the anode is water/hydroxide oxidation, dihydrogen oxidation, or chloride oxidation.

In specific embodiments of the invention, a carbon monoxide stream is mixed with at least one other chemical such as other gas or liquid compounds to generate higher added value products at the cathode of an electrolyzer. The carbon monoxide stream can be mixed with such additive chemicals at the time the carbon monoxide is supplied to the electrolyzer. In one such embodiment, imines, amines, nitrogen oxides, or ammonia are added to react with carbon monoxide, or an intermediate formed during its reduction, to form amide bonds or nitrogen rich organic compounds, such as amino acids. In another embodiment, aromatic or aliphatic acids/aldehydes/alcohols are added to react with the carbon monoxide, or an intermediate formed during its reduction, to form hydrocarbons, alcohols or organic acids. In another embodiment, aromatic or aliphatic olefins or hydrocarbons are added to react with the carbon monoxide, or an intermediate formed during its reduction, to form hydrocarbons, alcohols or organic acids. These reactions can be combined with any of the reactors mentioned above. For example, the oxidation occurring at the anode can be water oxidation, hydroxide oxidation, dihydrogen oxidation, or halide oxidation.

While the specification has been described in detail with respect to specific embodiments of the invention, it will be appreciated that those skilled in the art, upon attaining an understanding of the foregoing, may readily conceive of alterations to, variations of, and equivalents to these embodiments. The disclosure of volumes of chemicals in this disclosure is not meant to refer to a physically isolated volume as it is possible for a volume of dihydrogen to exist with a volume of carbon dioxide in a single physical volume in the form of a volume of syngas. Although examples in the disclosure where generally directed to the production of dihydrogen, the same approaches could be utilized in other industrial processes in which carbon monoxide is made available such as in the steel industry. Furthermore, while the examples in this disclosure were generally applied to industrial chemical processes, the same approaches are applicable to chemical processing of any scale and scope. Furthermore, while the examples in this disclosure were generally applied to the delivery of carbon monoxide to an electrolyzer, approaches disclosed herein are more broadly applicable to the delivery of any member of the oxocarbon family to an electrolyzer for the purposes of generating useful chemicals therefrom. These and other modifications and variations to the present invention may be practiced by those skilled in the art, without departing from the scope of the present invention, which is more particularly set forth in the appended claims.

What is claimed is:

1. A method comprising:
augmenting a production line with an electrolyzer comprising an electrolyte, wherein: (i) the production line is a hydrogen production line; (ii) the production line includes a syngas production system; and (iii) the electrolyte of the electrolyzer is a concentrated alkaline solution;
separating a volume of carbon monoxide from the production line, after the syngas production system, using a separation system;
supplying, after separating the volume of carbon monoxide using the separation system, the volume of carbon monoxide to a cathode area of the electrolyzer; and
generating, using the volume of carbon monoxide and the electrolyzer, a volume of generated chemicals;
wherein the volume of generated chemicals is at least one of: a volume of hydrocarbons, a volume of organic acids, a volume of alcohol, a volume of olefins and a volume of N-rich organic compounds; and wherein the separation system separates out the volume of carbon monoxide from carbon dioxide and other impurities before the volume of carbon monoxide is supplied to the cathode area of the electrolyzer.

2. The method of claim 1, wherein:
a feedstock for the syngas production system is a volume of natural gas.

3. The method of claim 2, wherein:
the syngas production system conducts a steam methane reforming process on a volume of natural gas to produce a volume of syngas; and
no carbon monoxide from the volume of syngas is used in a water gas shift reaction.

4. The method of claim 1, wherein:
the syngas production system includes a gasification process; and
a feedstock for the gasification process is at least one of biomass and waste.

5. The method of claim 1, further comprising:
supplying a volume of carbon dioxide to be used in the syngas production system.

6. The method of claim 5, wherein:
the volume of carbon dioxide is obtained from a water gas shift reaction conducted on a second volume of carbon monoxide from the syngas production system.

7. The method of claim 1, wherein the generating using the volume of carbon monoxide and the electrolyzer comprises:
supplying the volume of carbon monoxide to the cathode area of the electrolyzer as a cathodic input fluid; and
supplying a volume of electrolyte to an anode area of the electrolyzer as an anodic input fluid.

8. The method of claim 7, further comprising:
supplying a volume of oxygen generated by the electrolyzer from an anodic output to the syngas production system; and
wherein the syngas production system conducts one of an oxidation process and a partial oxidation process.

9. The method of claim 1, further comprising:
providing a volume of dihydrogen; and
wherein the generating of the volume of generated chemicals comprises:
supplying the volume of carbon monoxide to the cathode area of the electrolyzer as a cathodic input fluid; and
supplying the volume of dihydrogen to an anode area of the electrolyzer as an anodic input fluid.

10. The method of claim 9, wherein:
the volume of dihydrogen includes a parasitic dihydrogen output of the cathode area; and
the parasitic dihydrogen output is circulated from a cathodic output of the electrolyzer to an anodic input of the electrolyzer.

11. The method of claim 9, wherein the separating of the volume of carbon monoxide comprises:
(i) supplying a volume of syngas from the syngas production system to a separation system; and
(ii) separating the volume of dihydrogen and the volume of carbon monoxide from the volume of syngas using the separation system.

12. The method of claim 1, further comprising:
supplying a volume of water to an anode area of the electrolyzer as an anodic input fluid; and
wherein the cathode area has a copper-based catalyst.

13. The method of claim 1, wherein:
the electrolyzer comprises at least one separating element selected from: an ion-conducting polymeric separator, a non-ion conducting polymeric separator, a diaphragm, a ceramic-containing material, a non-charged separator scaffold, and a mixed ceramic-organic compound separator.

14. The method of claim 1, wherein:
the volume of generated chemicals includes a volume of gaseous hydrocarbon and a volume of liquid alcohol.

15. The method of claim 1, wherein:
the volume of generated chemicals includes a volume of gaseous hydrocarbon and a volume of organic acid.

16. The method of claim 1, further comprising:
mixing the volume of carbon monoxide with a volume of at least one additive chemical; and
wherein the volume of carbon monoxide has been mixed with the volume of at least one additive chemical when the volume of carbon monoxide is supplied to the electrolyzer.

17. The method of claim 16, wherein:
the volume of at least one additive chemical includes water.

18. The method of claim 16, wherein:
the volume of additive chemical is one of an imines, amines, nitrogen oxides and ammonia; and
the volume of generated chemicals is a volume of amino acids.

19. A method comprising:
augmenting a production line with an electrolyzer comprising an electrolyte, wherein: (i) the production line is a hydrogen production line; (ii) the production line includes a reforming process; and (iii) the electrolyte of the electrolyzer is a concentrated alkaline solution;
supplying a volume of carbon dioxide and a volume of natural gas to the reforming process;
separating a volume of carbon monoxide from the production line, after the reforming process, using a separation system;
supplying, after separating the volume of carbon monoxide using the separation system, the volume of carbon monoxide to a cathode area of the electrolyzer; and
generating, using the volume of carbon monoxide and the electrolyzer, a volume of generated chemicals; and
wherein: (i) the reforming process consumes the volume of carbon dioxide; and (ii) the separation system separates out the volume of carbon monoxide from carbon dioxide and other impurities before the volume of carbon monoxide is supplied to the cathode area of the electrolyzer.

* * * * *

UNITED STATES PATENT AND TRADEMARK OFFICE
CERTIFICATE OF CORRECTION

| | |
|---|---|
| PATENT NO. | : 11,788,022 B1 |
| APPLICATION NO. | : 17/980912 |
| DATED | : October 17, 2023 |
| INVENTOR(S) | : Sarah Lamaison |

It is certified that error appears in the above-identified patent and that said Letters Patent is hereby corrected as shown below:

In the Specification

In Column 14, Line 49:
Change "In system 400 of Fig. 4A, the syngas production system is a reforming reactor 401 such as a dry methane reforming reactor or an autothermal reforming reactor. Fig. 4" to --In system 400 of Fig. 4A, the syngas production system is a reforming reactor 401 such as a dry methane reforming reactor or an autothermal reforming reactor. Fig. 4A--

Signed and Sealed this
First Day of October, 2024

Katherine Kelly Vidal
*Director of the United States Patent and Trademark Office*